(12) United States Patent
Watanabe

(10) Patent No.: US 6,721,247 B2
(45) Date of Patent: Apr. 13, 2004

(54) DISK APPARATUS AND TRACK FOLLOWING CONTROL METHOD

(75) Inventor: Ichiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 435 days.

(21) Appl. No.: 09/899,434

(22) Filed: Jul. 5, 2001

(65) Prior Publication Data

US 2002/0016642 A1 Feb. 7, 2002

(30) Foreign Application Priority Data

Jul. 10, 2000 (JP) .................... 2000-208946
May 2, 2001 (JP) .................... 2001-135470

(51) Int. Cl.$^7$ .................................. G11B 7/00
(52) U.S. Cl. .................. 369/44.34; 369/44.28; 360/77.04
(58) Field of Search ............... 369/44.34, 44.32, 369/30.13, 30.14, 53.14; 360/77.04

(56) References Cited

U.S. PATENT DOCUMENTS 5,268,834 A  12/1993 Sanner et al.
6,628,579 B2 * 9/2003 Watanabe et al. ........ 369/44.34

FOREIGN PATENT DOCUMENTS

| EP | 1 014 366 | 6/2000 |
|----|-----------|--------|
| JP | 08-077589 | 3/1996 |
| JP | 2000-285583 | 10/2000 |
| JP | 2000-293866 | 10/2000 |

OTHER PUBLICATIONS

Tomizuka et al., Analysis and Synthesis of Discrete–Time Repetitive Controllers, Journal of Dynamic Systems, Measurement and Control, Sep. 1989, vol. 111, pp. 353–359.
Kempf, et al., Comparison of Four Discrete–Time Repetitive Control Algorithms, IEEE Control Systems, pp. 48–54, Dec. 1993.
Sanner et al., Gaussian Networks for Direct Adaptive Control, IEEE Trans. Neural Networks, vol. 3, No. 6, Nov. 1992.
Cannon et al., Space Frequency Localized Basis Function Networks for Nonlinear System Estimation and Control, Neural Computing 9 (1995), 295–342.

* cited by examiner

Primary Examiner—Doris H. To
Assistant Examiner—Jorge L Ortiz-Criado
(74) Attorney, Agent, or Firm—Greer, Burns & Crain, Ltd.

(57) ABSTRACT

A disk apparatus has a head, a positional signal detection section that detects a track of a medium, a feedback control section which computes a control signal for moving the head from the location of a positional signal generated by a position signal detector, and a learning control section which generates and stores an unknown function for one disk rotation, which includes a periodic disturbance, in a memory which is comprised of N number of memory cells by a learning algorithm as an approximate function which is approximated by the height of each of several blocks in the medium. The learning control section reads the learning result of the two memory cells at locations which are moved forward for a predetermined amount of time, and interpolates the results so as to generate a periodic disturbance compensation signal.

20 Claims, 23 Drawing Sheets

FIG. 6

| A. Feedback control process | ①Arithmetic of feedback controller |
|---|---|
| B. Learning process (Memory updating process) | ②Selection of memory cell to be updated by learning algorithm<br>③Update object memory cell(learn) |
| C. Learning result output process (Memory output process) | ④Selection of memory cells to be output<br>⑤Arithmetic of learning control output value FF<br>⑥Output ouput value |

FIG. 7

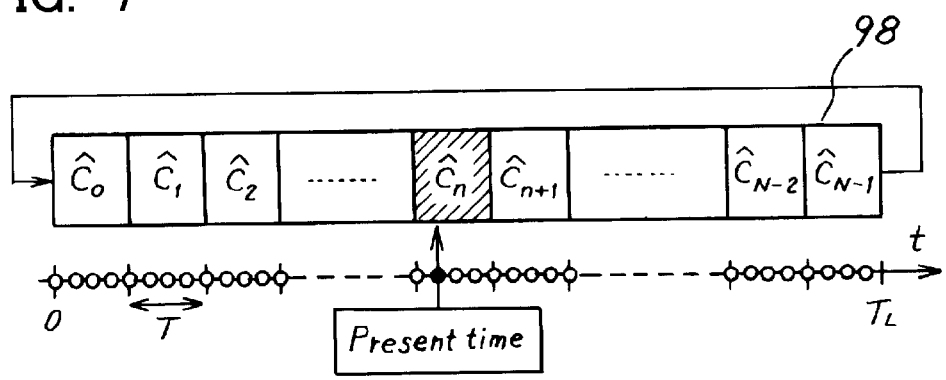

$$i_u = floor(\frac{t}{T})$$

$$\hat{C}_{i_u}(N) = \hat{C}_{i_u}(L) + k \cdot T_s \cdot I_{FB}$$

$$io = floor\left(\frac{t + \Delta tl}{T}\right)$$

$$\text{if} \quad io \le N - 2 \quad \text{then} \quad io1 = io, io2 = io1 + 1$$
$$\text{if} \quad io = N - 1 \quad \text{then} \quad io1 = N - 1, io2 = 0$$
$$\text{if} \quad io \ge N \quad \text{then} \quad io1 = io - N, io2 = io1 + 1$$

$$1_{FF}(\Delta T) = \hat{C}io1 + \frac{\hat{C}io2 - \hat{C}io1}{T} \times \Delta T$$

t=0 t=Ts t=2Ts t=3Ts t=4Ts $$i = \text{floor}\left(\frac{t+\frac{T}{2}}{T}\right)$$

$$\text{if } i \leq N-1 \text{ then } iu = i$$
$$\text{if } i = N \text{ then } iu = 0$$
$$\hat{C}iu(N) = \hat{C}iu(L) + K \cdot T_s \cdot I_{FB}$$

$$i = \text{round}\left(\frac{t}{T}\right)$$

$$\text{if } i \leq N-1 \text{ then } iu = i$$
$$\text{if } i = N \text{ then } iu = 0$$
$$\hat{C}iu(N) = \hat{C}iu(L) + K \cdot T_s \cdot I_{FB}$$

t=0 t=Ts t=2Ts t=3Ts t=4Ts $$i_{u1} = floor\left(\frac{t}{T}\right)$$

$$i_{u\_2} = \begin{cases} i_{u1} + 1 & if\ i_{u1} < N-1 \\ 0 & if\ i_{u1} = N-1 \end{cases}$$

$$\hat{C}_{iu1}(N) = \hat{C}_{iu1}(L) + k \cdot T_s \cdot (1-\lambda) \cdot I_{FB}$$

$$\hat{C}_{iu2}(N) = \hat{C}_{iu2}(L) + k \cdot T_s \cdot \lambda \cdot I_{FB}$$

$$\lambda = \frac{\Delta T}{T} = \frac{t - i_{u1} \cdot T}{T}$$

FIG. 18(A) t=0
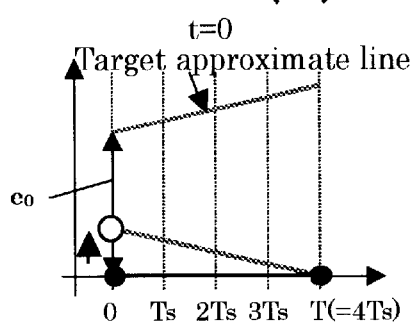
FIG. 18(B) t=Ts
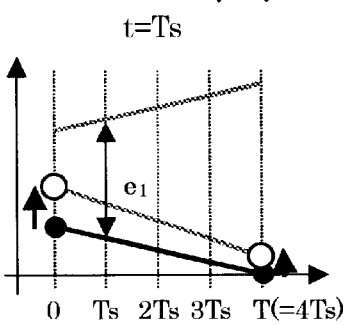
FIG. 18(C) t=2Ts
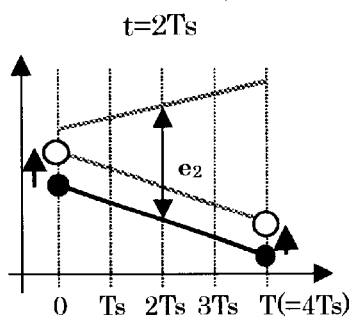
FIG. 18(D) t=3Ts
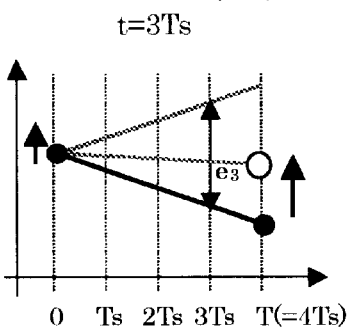
FIG. 18(E) t=4Ts
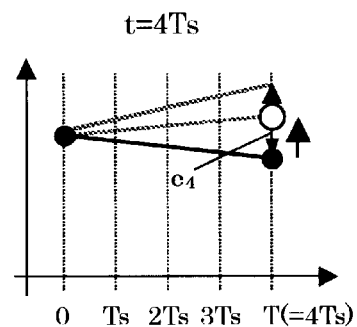

FIG. 20

| | Selection of update cell | Update process | Output-interpolate process |
|---|---|---|---|
| Prior art (Rectangular) | $i_u = floor(\frac{t}{T})$ | $\hat{C}_{i_u}(N) = \hat{C}_{i_u}(L) + k \cdot T_s \cdot I_{FB}$ | No-exist (Direct output) |
| First embodiment | | | Linear interpolation + Time-lead compensation |
| Second embodiment | $i_u = floor(\frac{t+\frac{T}{2}}{T})$ | | |
| Third embodiment | Select two memory cells | Simultanious update two memory with balancing | |

FIG. 21

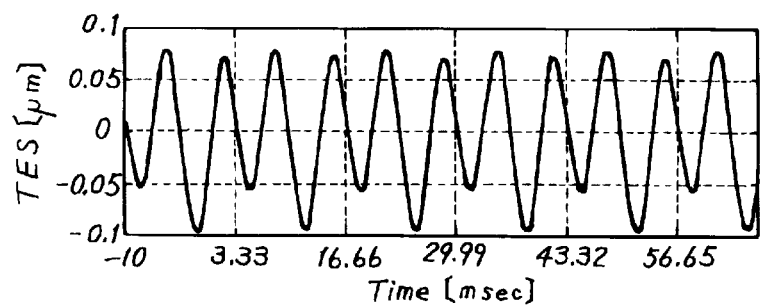

| A. Feedback control process | ①Arithmetic of feedback controller |
|---|---|
| C. Learning result output process (Memory output process) | ④Selection of memory cells to be output<br>⑤Arithmetic of learning control output value $I_{FF}$<br>⑥Output ouput value |

DISK APPARATUS AND TRACK FOLLOWING CONTROL METHOD

BACKGROUND OF THE INVENTION

1. Field of the Invention

The present invention relates to a track-following control method and a disk apparatus thereof which calculates the control signal for suppressing lead dislocation due to periodic disturbances, such as medium eccentricity by learning control, and executes feed-forward control in a control system to perform feedback control on the moving position of the carriage so that the dislocation amount of the head, with respect to the track center, becomes small (almost zero).

2. Description of the Related Art

A disk apparatus using such a disk as a magnetic disk, optical disk and magneto optical disk as a storage medium is widely used as a memory for images, data and music. In such a disk apparatus, the head must follow the track of the disk to read or write data on the track of the disk. Therefore, track-following control to detect the dislocation of the head from the track and to position the head to the track center is necessary. Recently since the track pitch of a disk is reaching high densities as the storage capacity of the disk increases, periodic disturbance along with the rotation of the disk must be compensated, and for this reason track-following control to compensate for the periodic disturbance is required.

Eccentricity of the disk is generally known as a periodic disturbance, but a periodic disturbance with a frequency higher than an eccentric frequency also exists. In the case of an optical disk unit, for example, in order to improve the track-following performance of the optical beam to the medium track, a double drive type head mechanism is used, which is comprised of a carriage actuator for seek control (also called coarse control) which moves the carriage supported by a sliding bearing section on the stationary-installed guide rail, and a track actuator for tracking control (also called fine control) which moves the optical beam in the direction to cross the track by driving the objective lens mounted on the carriage.

Recently, however, a single drive type head mechanism that has only the carriage actuator, without using the track actuator, is widely used to decrease the cost of the unit. In a single drive type head mechanism, the ball bearing is eliminated from the sliding bearing section so as to decrease the number of parts and to decrease cost.

When such a disk unit is used, that is, when the head mechanism is a single drive type comprised of only the carriage actuator where the ball bearing is eliminated from the sliding bearing section of the carriage, the positioning control of the optical beam on the tracking center based on the tracking error signal is strongly influenced by the solid friction of the carriage bearing section.

FIG. 30 shows the characteristics of solid friction in the single drive type carriage. Here, the moving speed 'V' and the friction force 'F' have plus or minus values depending on the moving direction of the carriage. Now consider the case when the moving speed 'V' of the carriage changes from minus to plus. While the carriage is moving at a moving speed 'V' with a minus value, the roughly constant kinetic friction force 'F1' is being generated regardless the moving speed. When the moving speed 'V' of the carriage with respect to the guide rail becomes zero and the carriage begins to move in the opposite direction, a drive force exceeding the static friction force '−F2' is required, then a roughly constant kinetic friction force '−F1' is generated.

When the moving speed of the carriage inverts like this, the abrupt change of the friction force acts on the control system as a disturbance, and in order to sufficiently compensate for this disturbance, a feedback control system with a high band is generally required.

The moving speed of the carriage is inverted by the track-following control which periodically compensates the dislocation of the track due to the eccentricity of the disk medium. In other words, when the carriage is controlled so as to follow the eccentricity of the medium, the movement of the carriage with respect to the guide rail is a reciprocating motion synchronizing with the eccentricity period. Therefore the moving speed of the carriage inverts at least twice during a rotation of the medium, and a disturbance due to an abrupt change of the friction force in steps is received each time inversion occurs.

FIG. 29 shows waveform diagrams during track-following under the influence of Coulomb's friction disturbance, which is an acceleration of the positioner (carriage) for track-following, a change of the friction disturbance, and a waveform of the ideal drive current 'I ideal' of the positioner required for track-following, sequentially from the above. The rotation period of the disk is 13.33 ms, and waveforms for three rotation periods of the disk are shown. To simplify description, the static friction factor and the dynamic friction factor are equally $\mu=0.4$.

As FIG. 29 shows, in order to implement high precision track following, the ideal drive signal for the positioner should include not only the drive signal for generating the acceleration of the positioner, but also the drive signal that changes abruptly to cancel the friction changes. By a feedback controller, it is difficult to generate such drive signals which include sudden changes because of the limitation of the control band thereof. In other words, a sufficient control band cannot be achieved because of the restriction of the mechanical resonance of the positioner, and as a result, large tracking errors occur.

As FIG. 30 shows, Coulomb friction disturbance, which is a function of the speed of the positioner, can be compensated for using the speed information of the positioner. However, in the case of a disk unit, such as a magneto-optical disk unit, as the velocity information is not obtained with respect to the guide rail due to not have a sensor to measure the location of the positioner with respect to the guide rail, such a compensation cannot be performed. Therefore by considering periodic disturbance synchronizing with disk rotation, feed-forward compensation by learning and obtaining the repetitive disturbance compensation signal is proposed.

As a typical method to compensate such a periodic disturbance, repetitive control is known. In repetitive control, the basic period of a periodic disturbance is divided, for example, by a sampling period of the feedback control system, memory corresponding to each divided period is prepared, and the periodic disturbance is compensated. In a disk unit, such as a magneto-optical disk unit, however, the sampling period of the feedback control system is relatively short. So if the rotation period of the disk is divided by the sampling period, memory length is very long. For example, when the disk rotation frequency is 75 Hz (4500 rpm), the sampling rate is 55 kHz, and memory length is 733. If the resolution of one memory length is 256 bits, a 187 kbit capacity is required.

In order to decrease the memory length, it is possible to set the dividing period of the repetitive control system to a multiple integer of the sampling period of the feedback control system, and skip the feedback information obtained at the sampling period, but learning an accurate feed-forward compensation signal is difficult since feedback information is not effectively utilized.

Therefore the present inventor and others proposed a learning control system where information obtained at the sampling points of the feedback control system can be effectively used for the convergence of learning, even if the sampling frequency of the feedback control system and the dividing period of the learning waveforms (memory length of learning result) are independently set (an example of this is stated in the ASPE (American Society for Precision Engineering) 1999 Meeting paper "A Precise Track following Control using a Single-stage Tracking Mechanism for Magneto-optical Disk Drive).

This conventional proposal will be described with reference to FIG. 31 to FIG. 33. FIG. 31 is a block diagram of a conventional track-following control system, where a learning control section 101 obtains and stores an unknown function for one rotation of the disk medium as an approximate function by a learning algorithm so that dislocation due to a periodic disturbance becomes almost zero. The learning control section 101 approximates an unknown function for one rotation of the medium to implement dislocation due to a periodic disturbance, such as medium eccentricity synchronizing medium rotation, to be zero, by the height of rectangle C^i of each block (FIG. 33) when the time required for one rotation of the medium is divided by N, and obtains and stores the unknown function as an approximate function.

The learning control section 101, which is between the feedback computing section 100 and the tracking drive section 102, approximates an unknown drive current function Iid (t) which repeats from the start time t=0 to the end time t=TL of one rotation of the medium when the time required for one rotation of the medium is TL as the approximate function I^id (t) by the height of each block C^i having block number i=0–(N–1) when the time required for one rotation of the medium TL is divided by N, and obtains and stores the unknown drive current function as an approximate function I^id(t) by the learning algorithm.

The learning control section 101 comprises a plurality of storage cells which store the height C^i of the rectangular function of each block of the approximate function I^id. The learning control section 101 samples the control signal IFB which is output from the feedback computing section 100, and calculates and updates the height C^i of the rectangular function of each block of the approximate function I^id (t) stored in each storage cell of the memory based on the sampled control signal IFB and the predetermined learning gain Klearn.

And the learning control section 101 reads the height C^i of the rectangular function of each block of the approximate function I^id (t) which was stored in the storage cells of the memory synchronizing with the division period T of the medium rotation, as the learning control signal IFF, adds the learning control signal IFF to the control signal IFB from the feedback computing section 100, and supplies the drive signal IREF to the drive section 102.

According to this learning control section, a stepped friction disturbance compensation signal with high band along with the inversion of the carriage moving direction can be included in the finally obtained learning result, even if it takes some time to converge the learning result, by the low learning gain. By adding this learning control signal to the feedback system by the feed-forward control, the stepped friction disturbance can be eliminated from the feedback control system, track-following errors due to eccentricity of the medium can be decreased even if there is a limitation due to the existence of a higher resonance and even if the control band is low, and the accuracy of on-track control can be improved.

According to prior art, a functional approximation with sufficient accuracy is possible if the number of rectangular functions (that is, memory length) N to be used for a functional approximation is sufficiently large. However, a further decrease in the memory length is demanded. In this case, the number of divisions N must be decreased when the above stepped approximate function is used. If the number of divisions N is decreased, the stepped approximation output cannot be ignored, and when the approximation function is used for the feed-forward compensation signal, the stepped output becomes a disturbance and the track-following accuracy becomes worse.

Since the learning result of the cell corresponding to the learning time of the memory is feed-forward output during the learning of the memory with a phase delay occurring in the feedback control system, and as a result the track-following accuracy drops and the control system in general becomes unstable. For example, when a learning is executed in a system where a disturbance including a relatively high frequency component, such as a stepped disturbance, exists, if the learning result of the cell corresponding to the learning time is feed-forward output, and as a result learning sometimes becomes unstable, and the control system becomes unstable because of the phase delay existing in the feedback control system.

SUMMARY OF THE INVENTION

With the foregoing in view, it is an object of the present invention to provide a disk apparatus and a track-following control method thereof to improve the learning accuracy of a periodic disturbance along with the rotation of the disk.

It is another object of the present invention to provide a disk apparatus and a track-following control method thereof to decrease the learning memory length.

It is still another object of the present invention to provide a disk apparatus and a track-following control method thereof to decrease the learning memory length so as to decrease the learning time and to decrease the influence of high frequency noise.

To achieve this object, the track-following control system of the present invention comprises a head which moves to an arbitrary track position of a disk medium, a positional signal detection section which detects a positional signal according to the dislocation amount of the head from a predetermined reference position of the track on the medium, a feedback control section which computes a control signal for moving the head from the positional signal so that the dislocation amount is controlled to zero, a drive section which drives the head based on the control signal, and a learning control section which generates an unknown function for one disk rotation that includes a periodic disturbance stores it in a memory which is comprised of N number of memory cells by a learning algorithm as an approximate function which is approximated by the height of each block when the time required for one rotation of the disk medium is divided by N. The learning control section samples a signal which follows the positional signal according to the learning algorithm at a sampling period which is less than the time obtained by dividing the time required for one rotation of the medium by N, and updates one or more memory cells corresponding to the sampling time synchronized with the sampling period according to the signal value. The learning control section also reads the values of two memory cells located at the cell positions corresponding to the output time at an output period which is less than the time obtained by the time required for one rotation of the medium by N, and interpolates the values of both the memory cells based on the output time, so as to generate a periodic disturbance compensation signal.

According to the present invention, the high-speed memory update rate, the high-speed output rate and the interpolating processing are combined by the learning control section so that the stepped output is prevented, problems due to a feed-forwarding high frequency disturbance by stepped output are prevented, and high precision track-following control can be implemented. Especially with removable medium, such as MO, eccentricity is relatively large compared with HDD, and when such a medium with large eccentricity is used, the discontinuity of the stepped output in the learning result becomes conspicuous (that is, the height difference between the steps becomes conspicuous) because of the increase in the amplitude of the periodic disturbance, so in this case the effect of smoothing by linear interpolation is large.

By combining the learning result output period, which is shorter than the period (TL/N) when the time required for one disk rotation is divided by the memory length N, and the above mentioned linear interpolating processing, very smooth output of periodic disturbance compensation signals is possible, and very accurate track-following control can be implemented.

Since stepped output is prevented, the memory length (number of divisions) can be decreased. In other words, it was demanded to decrease the memory length according to the frequency range (generally at a certain frequency or less) of the periodic disturbance to be suppressed, but in a conventional method, the stepped output problem makes it impossible to decrease the number of divisions to a certain value or less. Therefore in some cases, an unnecessarily high frequency range had to be included in the learning target. If an unnecessarily high frequency component is included in the learning target, the averaging effect on the non-repetitive disturbance decreases, the learning result includes noise, and track-following accuracy drops.

Particularly when the learning operation is performed at a specified position in the radius direction on the medium, and the learning result is feed-forwarded as a fixed value, track-following accuracy may drop since the high frequency periodic disturbance may differ depending on the position in the radius direction, and an effectively learned high frequency periodic disturbance at a location may become a disturbance at another location. In such a case, it is necessary to decrease the number of divisions so as to limit the frequency range to be the target of learning. The present invention can meet such a demand since the memory length (number of divisions) can be decreased considerably compared with prior art.

Also as a secondary effect when the number of divisions is decreased, the averaging effect on unnecessarily high frequency noise improves, and as a result, the high frequency noise included in the learned waveform output is decreased and a higher precision track-following accuracy can be expected. The averaging effect on the anti-periodic high frequency disturbance can also be expected.

As another secondary effect when the number of divisions is decreased, the converging time in learning can be decreased. For example, if the memory length is decreased by half, the converging time required for convergence of learning for the same learning gain can be decreased by half. When disturbance learning is performed for a load sequence after inserting a medium, for example, this secondary effect contributes to decreasing the rise time after disk insertion until access actually becomes possible.

Also according to the present invention, the above mentioned learning algorithm of the learning control section is for calculating the memory cell value after an update by multiplying the sampled signal by a predetermined or variable gain, and adding the computing result to the memory cell value before the update, so high precision learning is possible with a simple algorithm.

Also according to the present invention, the above mentioned learning control section reads the values of the two memory cells at positions associated at a advanced time from the update target memory cell(s) for a predetermined amount of time, and performs interpolating processing for the values of the two memory cells so as to generate a periodic disturbance compensation signal corresponding to the advanced time for the predetermined amount of time. So a time-delay, such as a phase delay of the control target, is considered and the learning result corresponding to a time moved forward is feed-forward output, therefore it is unnecessary to use a phase progress filter. By time-lead compensation for the feed-forward output of the learning result in this way, vibratory fluctuation of a response waveform can be prevented, as in the case without the time-lead compensation, and a stable learning result can be obtained.

According to the present invention, the learning control section samples a signal which follows the position signal, selects two memory cells corresponding to the sampling time as the update target, and updates the values of the memory cells by the learning algorithm, so as to learn the unknown function, therefore learning with higher precision interpolating processing is possible.

Also according to the present invention, the above mentioned learning algorithm of the learning control section changes the update gains for the two memory cells according to the sampling time, and adjusts the update balance between the two memory cells when the two memory cells are updated, so that learning with higher precision interpolating processing is possible.

Also according to the present invention, the above mentioned learning control section samples signals which follow the position signal, updates a value of one of the memory cells, which is allocated to a time close to the sampling time, by the learning algorithm, and learns the unknown function, so that the unknown function can be efficiently learned even if the memory length is decreased, and the calculation amount can be decreased.

BRIEF DESCRIPTION OF THE DRAWINGS

FIG. 6 is a diagram depicting the processing in the learning mode of the control system in FIG. 3;

FIG. 7 is a diagram depicting the learning processing of the first embodiment of the present invention;

FIGS. 18(A),18(B),18(C),18(D) and 18(E) are diagrams depicting the learning steps of the third embodiment of the present invention;

FIG. 20 is a table comparing the learning processing between prior art and each embodiment of the present invention;

FIG. 21 is a waveform diagram of a tracking error signal of the feedback control system as a comparison example;

DESCRIPTION OF THE PREFERRED EMBODIMENTS

Embodiments of the present invention will now be described in the sequence of disk apparatus, feedback and learning control, and other embodiments.

[Disk Apparatus]

Figure 1:
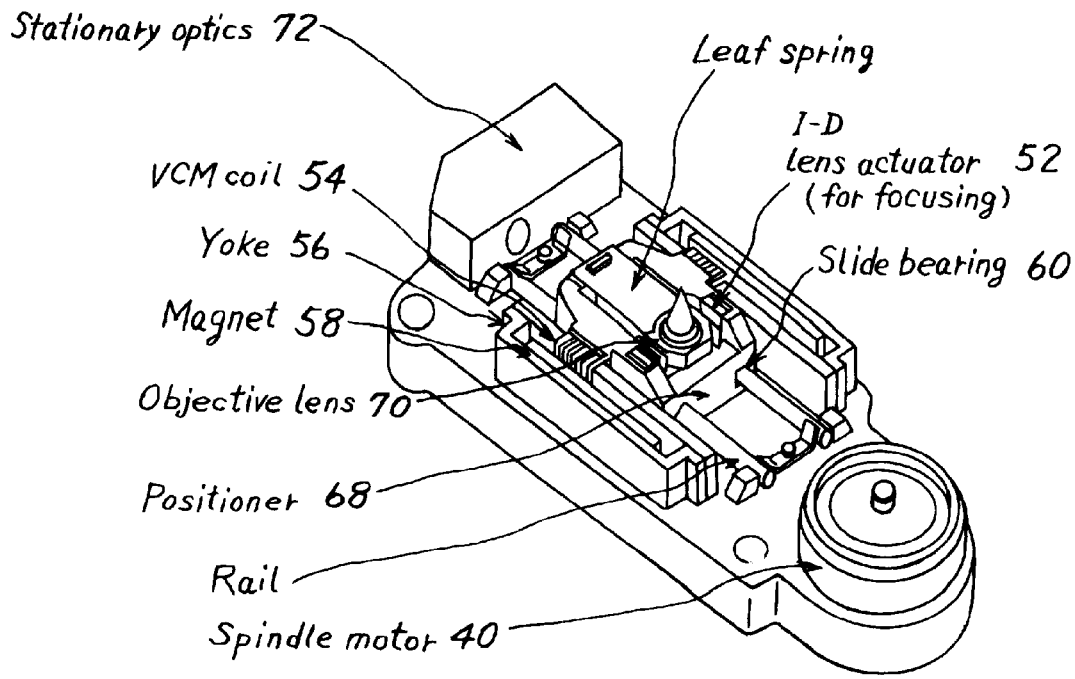
FIG. 1 is a perspective view of a disk drive, which is an embodiment of the present invention.
Figure 2:
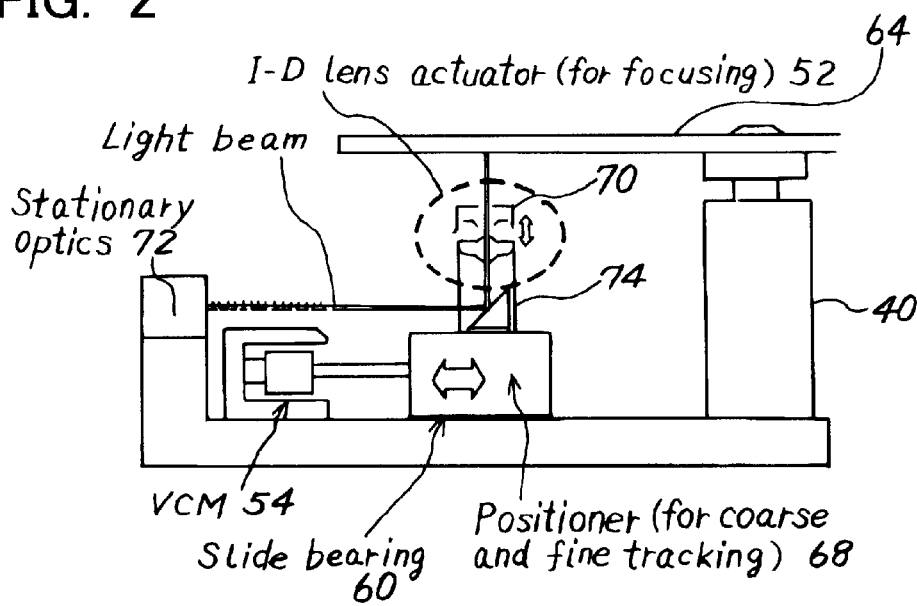
FIG. 2 is a cross-sectional view of the drive in FIG. 1.

FIG. 1 and FIG. 2 are drawings depicting the configuration of a disk drive mechanism of an embodiment of the present invention, using a magneto-optical disk drive as an example. The drive mechanism has a spindle motor 40. By inserting an MO (magneto-optical) cartridge into the hub of the rotation axis of the spindle motor 40 from the inlet door (not illustrated), the MO medium 64 inside the cartridge is loaded onto the hub of the rotation axis of the spindle motor 40.

The head mechanism is comprised of a carriage 68, an objective lens 70, a stationary optical system 72, and a mirror 74. At the bottom side of the MO medium 64 of the loaded MO cartridge, a carriage 68, which can freely move in the direction crossing the track of the medium by VCM 54, is disposed.

An objective lens 70 is mounted on the carriage 68, and an optical beam from the laser diode in the stationary optical system 72 is emitted via the rise mirror 74, and a beam spot is formed on the medium surface of the MO medium 66. The objective lens 70 is moved in the optical axis direction by the control of the focus actuator 52. The optical beam can be moved in a radius direction crossing the track of the medium according to the linear driving of the carriage 68 by the VCM 54.

The VCM 54 is installed on the carriage 68, and a magnet 58 and a yoke 56 are installed at the fixed side. The VCM 54 of the carriage 68 is configured in this way. The carriage 68 is supported with two guide rails, which are fixed, by the slide bearing, and the VCM 54 performs seek control for moving the optical beam to an arbitrary track position, which is known as coarse control, and tracking control for following up the optical beam at the sought track position to the track center, which is known as fine control, simultaneously.

For such a single drive type head mechanism, one described in Japanese Patent Laid-Open No. H9-312026 and No. H9-54960, for example, can be used.

Figure 3:
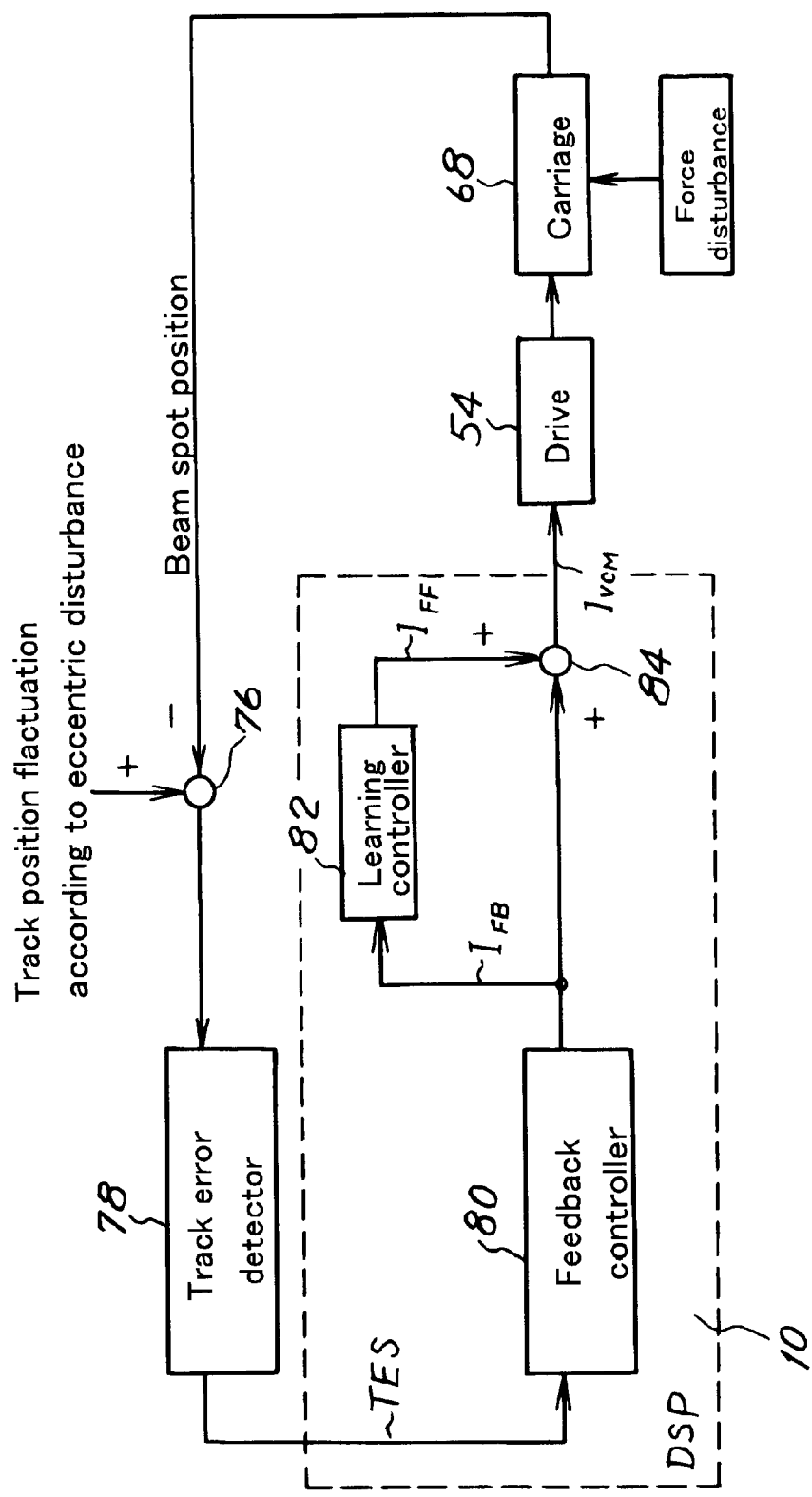
FIG. 3 is a block diagram depicting the first embodiment of the present invention where a learning control section is created between a feedback control section and a drive section.
Figure 4:
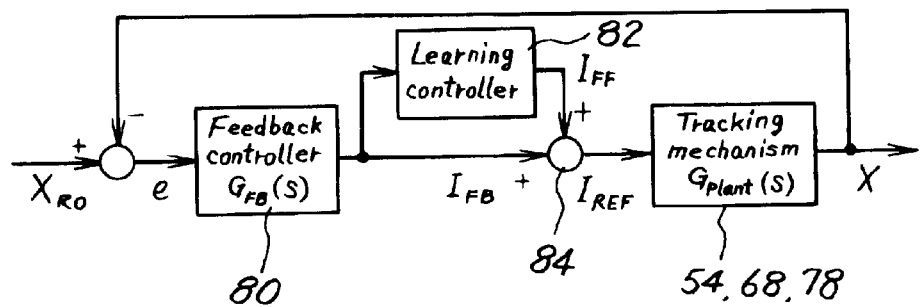
FIG. 4 is a block diagram depicting the control system in FIG. 3.
Figure 5:
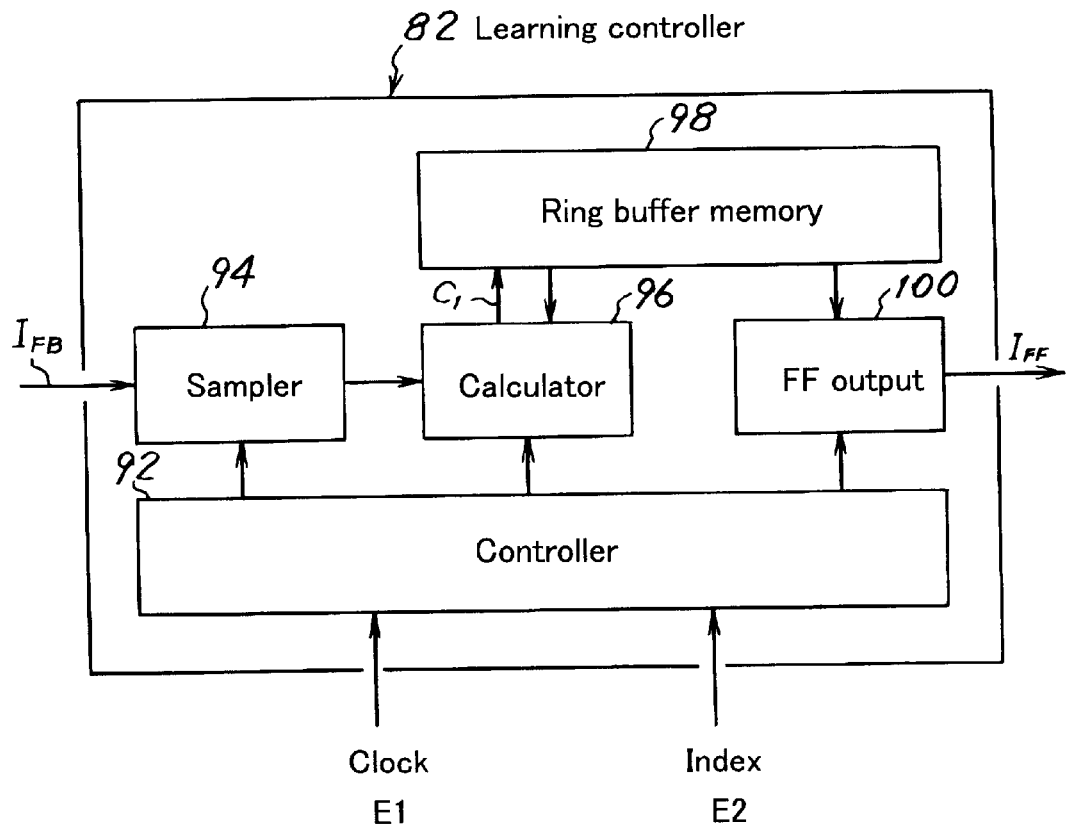
FIG. 5 is a functional block diagram of the learning control section in FIG. 4.

FIG. 3 is a block diagram of the feedback control system of the head mechanism in the disk apparatus according to an embodiment of the present invention, FIG. 4 is a block diagram of the control system thereof, and FIG. 5 is a functional block diagram of the learning control section thereof. In this embodiment, the learning control section is provided between the feedback control section and the carriage drive section.

In FIG. 3, the feedback control system of the head mechanism is comprised of a tracking error detection section 78, a feedback control section 80, a learning control section 82, an adder 84, a carriage drive section (VCM) 54, and a carriage 68.

The tracking error detection section 78 creates a tracking error signal TES, which indicates the dislocation amount with respect to the track center, using the return light of the optical beam from the medium 64 by the objective lens 70 mounted on the carriage 68. To the input of this tracking error detection section 78, eccentric disturbance due to the eccentricity of the medium 64 is added from the adding point 76.

The feedback control section 80 receives the tracking error signal TES, and calculates a feedback command value to move the carriage 68 by the carriage drive section 54 so that the tracking error signal TES becomes zero, that is, the dislocation of the optical beam with respect to the track center becomes nonexistent.

The feedback control section 80 calculates the control signal IFB by the PID (Proportional, Integrated and Differential) operation, for example, and this control signal IFB becomes the feedback current command value for the carriage drive section 54 using the VCM shown in FIG. 2.

The learning control section 82 is input the control signal IFB as the feedback current command value, which is output from the feedback control section 80, and obtains the learning control signal I^id, which is an approximate function of an unknown drive current function Iid to suppress such tracking errors by a periodic friction disturbance and an eccentric disturbance along with the eccentric rotation of the medium, by a learning rule. And the learning control section 82 outputs the feed-forward signal IFF by a learning control signal I^id, obtained as the learning result, synchronizing with the medium rotation.

Figure 29:
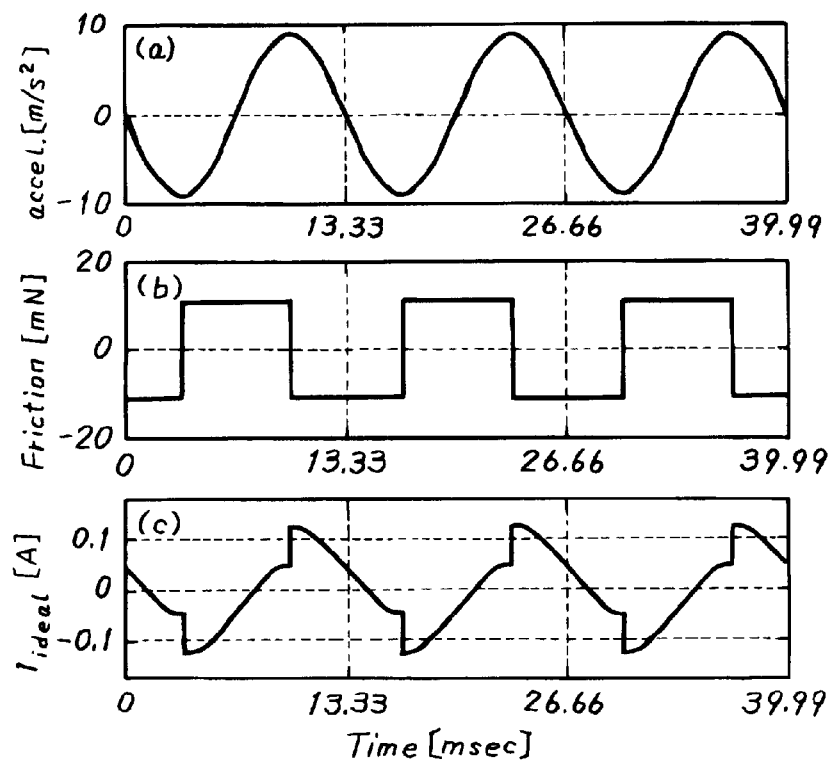
FIG. 29 is a diagram depicting the ideal positioner drive current to cancel a periodic disturbance by stationary friction.
Figure 30:
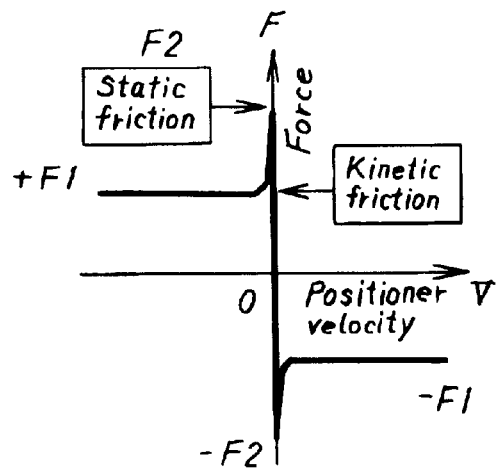
FIG. 30 is a characteristic diagram depicting the stationery friction with respect to the moving speed in the single drive type head mechanism.
Figure 31:
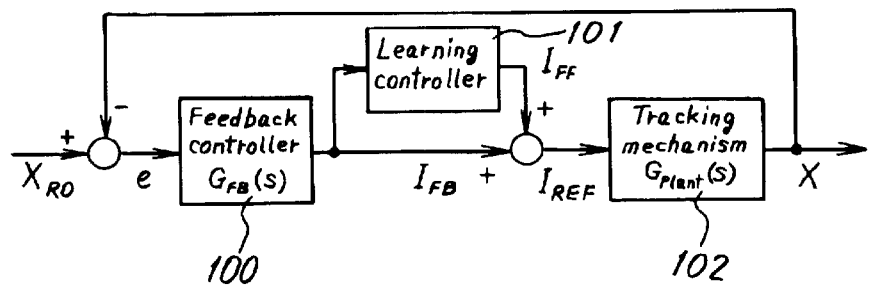
FIG. 31 is a block diagram depicting conventional learning control.
Figure 32:
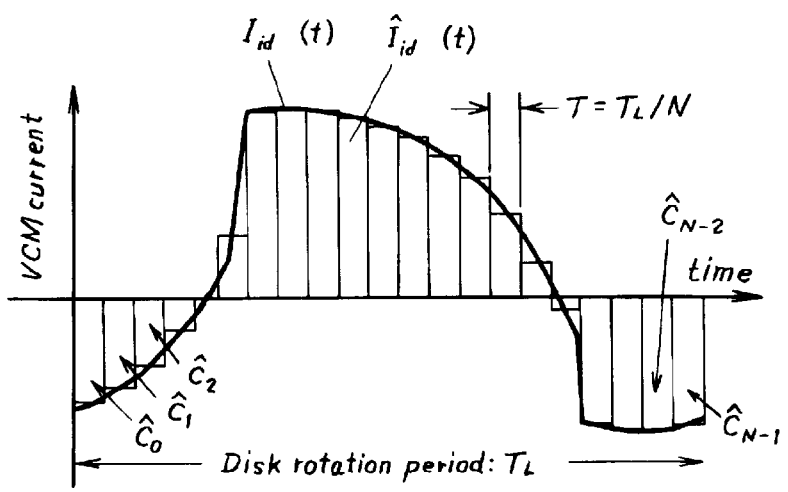
FIG. 32 is a diagram depicting conventional learning control.
Figure 33:
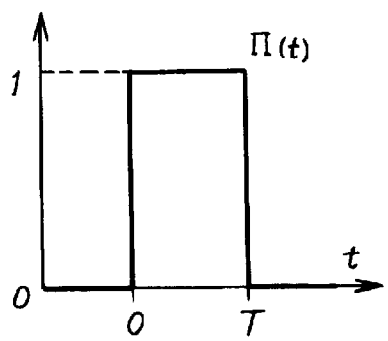
FIG. 33 is a diagram depicting conventional learning functions.

This feed-forward signal IFF is added to the control signal IFB from the feedback control section 80 by the adder 84, which result becomes the drive signal IVCM, and the carriage 68 is driven by the carriage drive section 54. In the carriage 68, as the moving speed is inverted by the reciprocating motion of the carriage 68 along with the eccentric rotation of the medium, a large friction disturbance which direction changes in steps at the point where the moving speed is zero is periodically applied as a force disturbance, as shown in FIG. 29 and FIG. 30.

The feedback control section 80, the learning control section 82 and the adder 84 are implemented as hardware by such a processor as DSP 10. FIG. 4 shows the configuration of the feedback control system with a transfer function. In FIG. 4, IREF shows a drive command value of the positioner, X, XRO and e show a position of the positioner, a track position to be a track-following control target, and a track-following error respectively. The learning control section 82 is input the output IFB of the feedback control section 80, and generates the approximate function IFF of the periodic disturbance compensation signal. IFF is superimposed onto the feedback control output IFB as a feed-forward compensation signal.

FIG. 5 is a functional block diagram of the learning control section 82 in FIG. 3. In FIG. 5, the learning control section 82 comprises a control section 92, a sample processing section 94, an approximate function computing section 96, a ring buffer memory 98, and a feed forward output section (hereafter "FF output section") 100.

To the control section 92, the clock signal E1 and the index signal E2, which is obtained synchronizing with one rotation of the medium, are input. The control section 92 sets (1) the learning mode and (2) the learning result output mode as the operation mode of the learning control section 82.

Specific processing in the learning control system 82 is sequentially executed at an arbitrary period Ts, which is shorter than the period T to provide the time resolution for the approximate function. In the present embodiment, Ts is the same period as the sampling period of the feedback control system. The learning control system 82 of the present invention can be inserted into an arbitrary straight path of the feedback loop, but in the configuration of the present embodiment, the learning control system 82 is inserted immediately after the feedback control system 80. The learning mode is executed, for example at load processing after the medium is inserted, and the learning control signals to be the approximate functions of the periodic disturbance signals are learned according to the learning rule while the recent learning result are output synchronized with the rotation of the disk medium and added to the feedback control system as the feed forward output. In the learning result output mode, the learning control signals obtained as the learning result in the learning mode are output synchronizing with the rotation of the medium, and are forwarded to the feedback control system as feed-forward output.

The control section 92 operates the sample processing section 94, the approximate function computing section 96, the ring buffer memory 98 and FF output section 100 in the learning mode, and operates the ring buffer memory 98 and the FF output section 100 in the learning result output mode. In the learning mode, the computing result of the approximate function computing section 96 is integrated in the corresponding memory cell of the ring buffer memory 98 according to the later mentioned learning rule, and at the same time, the FF output section 100 reads the computing result of the corresponding memory cell of the ring buffer memory 98. The adder 84 in FIG. 3 adds the computing result and forwards it to the feedback control system, that is, performs feed-forward control.

In the present embodiment, the sample period of the feedback control system 80 and the learning control system 82 are the same period Ts, so a series of processing shown in FIG. 6 are executed at each Ts. Recently these processing are generally all executed by digital computing, and are implemented by firmware on the fixed-point DSP 10, for example.

The processing flow shown in FIG. 6 is described as a flow of processing in the learning mode of the learning control section 82 at a period Ts. Note that the processing of the learning result output mode is described later in FIG. 24. In FIG. 6, the feedback computing processing is an operation of the feedback control system, and is comprised of, for example, error calculation and PID filter processing.

The learning processing is an update processing of the ring memory 98, where the approximate function computing section 96 in FIG. 5 calculates the memory cell number (cell address i) to be updated by the learning algorithm for the time progress in one rotation period TL from t=0, which is the time when the index signal E2 is obtained to the time when the next index signal is obtained. And the approximate function computing section 96 read the value stored in the calculated memory address of the ring buffer memory 98, update-arithmetic the read value using the output value of the sample processing section 94 and write the updated result to the original memory cell.

In the learning result output processing, a memory number to be the learning output target is selected, the learning control output value IFF is calculated, and the output value is output. When learning processing according to the learning mode ends, the learning mode transits to the learning result output mode. The learning result output mode is a mode to execute only output without updating the ring buffer memory 98, that is, omitting the learning process in the learning mode.

In the learning result output mode, the control section 92 operates the ring buffer memory 98 and the FF output section 100, reads the learning control signal as the learning result, which is stored in each memory cell of the ring buffer memory 98, at the same reading period as the sampling period Ts in the learning mode, synchronizing with the index signal E2, which is obtained at each rotation of the medium, and the FF output section 100 calculates the output value and outputs it to the adder 84 in FIG. 4. The adder 84 adds the output value to the control signal IFB obtained from the feedback control section 80 at this time, supplies the drive current IVCM to the carriage drive section 86, and performs feed-forward control for the carriage 88 so as to suppress the periodic friction disturbance due to the eccentricity of the medium.

The FF output section 100 executes linear interpolation on the read signal and computes the output value at each period Ts. As a result, smooth output is obtained. Also in order to guarantee stable learning processing, time delay, such as the phase delay of the control target, is considered when the FF output section 100 outputs the learning result stored in the ring buffer memory 98 to the feedback control system, and the stored learning result corresponding to the time that is a specific time ahead of the present time is feed-forward output.

Because the learning result corresponding to the time that is a specific time ahead is feed-forward output in this way, it is unnecessary to use a phase-lead filter. Since the learning control section 82 manages the current patterns to be the feed-forward output corresponding to the time t, two memory cells are selected according to the time moved forward considering the phase delay of the control target, and the learning result at this time is output. By the time-lead compensation for the feed-forward output of the learning result in this way, vibratory fluctuation of response waveforms can be prevented, as in the case without the time-lead compensation, and a stable learning result can be obtained.

[Feedback and Learning Control]

Now feedback and learning control will be described. At first, a case when one memory cell is an update target will be described for each processing of DSP 10, with reference to FIG. 7 to FIG. 10.

1. Processing When One Memory Cell is an Update Target;
  A. Operation of feedback control system;
    The tracking error signal (TES) is sampled by the AD converter (not illustrated), the feedback control operation, like the PID control system for example, is performed to calculate the output IFB of the feedback control system.
  B. Learning processing (memory update processing);
    [1] Selecting the number of the target memory cell to be updated by learning algorithm;
    Based on the time t ($0 \leq t < TL$, TL is the disk rotation period) synchronizing with the disk rotation, the target memory cell to be updated by the learning algorithm is selected. Time t is measured by the timer which is initialized at each disk rotation, and is obtained by reading this timer.
  The learning result is stored in the ring buffer 98 which has length N as shown in FIG. 7. FIG. 7 depicts the relationship between each memory cell and time t. As FIG. 7 shows, N number of memory cells are allocated to the time for one disk period at equal time interval T. A circle shows the sampling period Ts to execute a series of feedback control computing and the learning control computing shown in FIG. 6.
  Based on the time t read by the above mentioned timer, the following operation, for example, is executed so as to select the memory cell number iu (in FIG. 7, this corresponds to a number of subscript i of $c^i$) to be an update target.

$$iu = \text{floor}(t/T) \tag{1}$$

Here, the floor (x) function indicates a maximum integer value which is equal to or smaller than the argument x. For example, if the argument x in ( ) is ($0 \leq x < 1.0$), then floor (x)=0. If the argument x in ( ) is ($1.0 \leq x < 2.0$), then floor (x)=1. The time t is reset by the index signal which is obtained at each rotation of the medium, and therefore has the value $0 \leq t < TL$.

Therefore, as FIG. 7 shows, a memory cell is sequentially selected according to the current time t. Only the value $c^{iu}$ stored in the memory cell selected by the formula (1) is updated according to the following learning rule (2). Values in the other memory cells are not updated.

[2] Updating target memory cell (learning);
  The value $c^{iu}$ stored in the memory cell number iu selected by the formula (1) is updated as the formula (2).

$$c^{iu}(N) = c^{iu}(L) + k \times Ts \times IFB \tag{2}$$

Here, $c^{iu}$ (L) is a value before the update, $c^{iu}$ (N) is a value after the update. And the updated value $c^{iu}$ (N) is written to the memory cell of the memory cell number iu. k is a learning gain, and Ts is a sampling period. The learning processing completes here.

Figure 8:
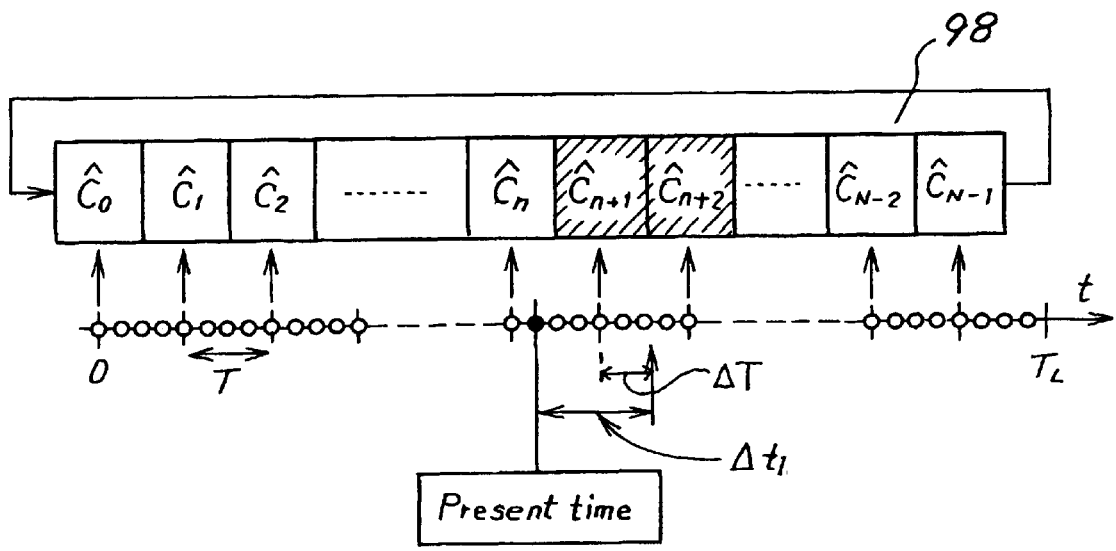
FIG. 8 is a diagram depicting the learning result output processing of the first embodiment of the present invention.

C. Learning result output processing (memory output processing);
  [1] Selecting two-memory cell numbers to be output target;
    When the learning result is output as mentioned above, time-lead compensation of $\Delta tl$ is added, as shown in FIG. 8, so as to assure the stability of the convergence of learning, and the memory cell number io of the output target cell is determined as the formula (3).

$$io = \text{floor}((t + \Delta tl)/T) \tag{3}$$

Then a memory cell next to this memory cell is also selected for linear interpolation. Since $\Delta tl$ has been added, io in the formula (3) may be N−1 or more. In this case, an applicable memory cell is selected returning to the beginning of the ring buffer 98. Therefore the two memory cell numbers io1 and io2 to be selected are given by the following formula (4)

if $io \leq N-2$, then $io1=io$, $io2=io+1$ if $io=N-1$ then $io1=N-1$, $io2=0$ if $io \geq N$ then $io1=io-N$, $io2=io1+1$ \hfill (4)

By linear interpolation, stepped output is prevented, which is particularly effective when the memory length is short. By executing linear interpolation for the two continuous memory cells in the output of the learning result, problems caused by discontinuous output due to stepped output in a conventional method can be prevented.

FIG. 8 is a diagram depicting the selection of the output target cell at the control sample time, which is the same as FIG. 7. In FIG. 7, $c^n$ is selected as the learning target according to formula (1), but in FIG. 8, a set of the next cells $c^{n+1}$ and $c^{n+2}$ is selected since the time-lead compensation of $\Delta tl$ is added. If it is designed to be $\Delta tl < T$ (if the number of division N is decreased, for example, T is increases in inverse proportion to this), a cell to be a learning target and a cell to be an output target may be the same depending on the timing of the control sample.

In this first embodiment, further when $\Delta tl$ is designed, the deigned value is obtained to subtract T/2 from the designed value. By this, it can be prevented that the memory cell to be output is deviated from the memory cell to be updated to perform a stable convergence of the learning. That is, it is important to make the timing relationship between the select timing of the updated memory cell and the select timing of the output memory cell to be consistent, and then to perform a proper adjustment by the time-lead compensation of $\Delta tl$ to be considered the closed loop characteristic of the feedback control system which is a learning control object, thereby performing the stable convergence of the learning.

[2] Calculating learning control system output value IFF;

When linear interpolation is executed on the two memory cell values defined by the time T interval, the output value is output according to the formula on a line passing through $(\Delta T, I_{FF})=(0, c\hat{}io1)$ and $(\Delta T, I_{FF})=(T, c\hat{}io2)$. In other words, the output value is implemented by the calculation of the following formula (5).

$$IFF(\Delta T) = c\hat{}io1 + (c\hat{}io2 - c\hat{}io1)\Delta T/T \quad (5)$$

Note that $\Delta T$ is calculated the below formula using the io of the formula (3).

$$\Delta T = (t + \Delta tl) - io \cdot T$$

D. Adding learning control system output value and feedback control value;

IFF determined in C [2] and IFB calculated in A are added, and the VCM drive signal IVCM is obtained as shown in the formula (6).

$$IVCM = IFF + IFB \quad (6)$$

Figure 9:
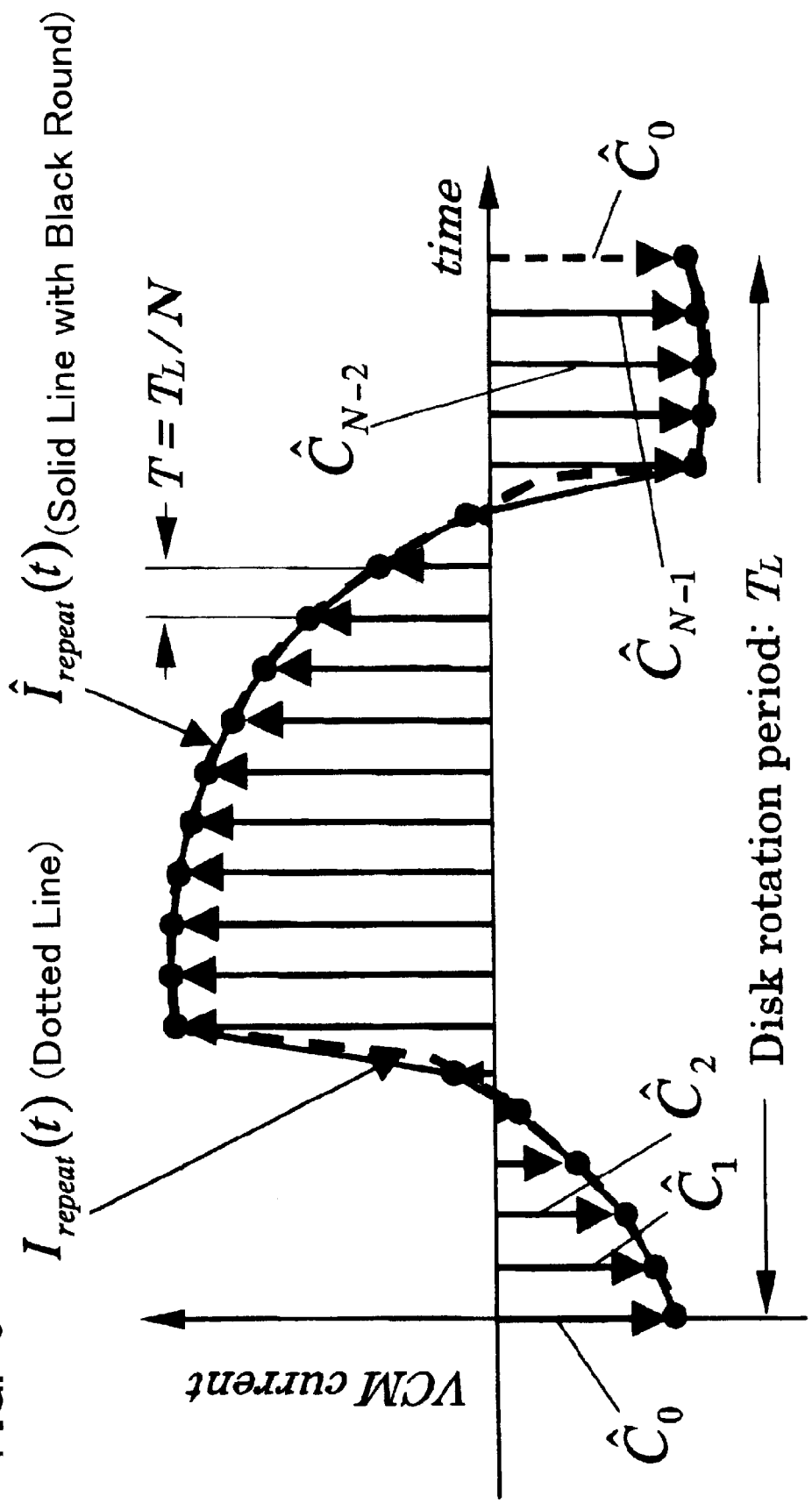
FIG. 9 is a diagram depicting the broken line approximation according to a linear interpolation of the first embodiment of the present invention.

FIG. 9 is a diagram depicting the drive current function for one rotation of the medium. As FIG. 9 shows, the period TL for one rotation of the medium is divided by N, N number of cells are allocated to the boundary points of the divisions, each memory cell value is regarded as the approximate value at each point, and these values of the memory cells are linearly interpolated (that is, polygonal approximation) and the approximate functions are generated.

The time width T of each block after N division is T=TL/N. In other words, the value stored in the memory cell indicates the height of each vertex of the polygonal approximation. The height of each vertex when the current pattern in FIG. 9 is polygonal-approximated at N points is C$\hat{}$i (where i=0, 1, ... (N-1)).

For the height C$\hat{}$i at each vertex of the polygonal approximation, learning is progressed by integrating the feedback control signal IFB in a time block corresponding to each vertex (memory cell) into the corresponding vertex height using formula (1) and (2). As the formula (1) shows, i is determined according to the value of t, that is, a height C$\hat{}$i at the learning target vertex is selected, and the integration operation is performed with the value IFB (t) of the control signal at this time as input. According to the learning rule based on the formula (2), the height C$\hat{}$i of each vertex is integrated until IFB, which is the input of the learning rule, becomes roughly zero, so after learning converges, the approximate function I$\hat{}$ repeat, when the heights of each vertex C$\hat{}$0~C$\hat{}$(N-1) are linearly interpolated and polygonal approximation is performed, becomes a function when the unknown drive current function I repeat is approximated.

During such a learning processing, the latest learning result I$\hat{}$ repeat is sequentially output from the learning control system, and is directly input into the drive current IVCM of the carriage drive section 54 which drives the carriage 68, so from the point of view of the feedback control system, periodic disturbance seems to have disappeared.

In this periodic disturbance compensation method by learning, even if the learning gain to obtain the learning result is a low gain, the final learning control signal to be obtained can contain a signal with a high frequency band in the range limited by the time width T of each one of the blocks after N division, that is, a high frequency band compensation signal for repetitive disturbance which is periodic.

For example, if the rotation speed of the medium is 4500 rpm, then the rotational frequency is 75 Hz, and the period of one rotation TL is 13.3 msec., and it is assumed that one period TL is divided by N=128, for example. In this case, the time width T per one rectangle is T=TL/N=104.2 $\mu$sec.

Therefore, if the sampling frequency of the control signal IFB from the feedback control section 80 to the learning control section 82 is 55 kHz, that is, the sampling period Ts=18.18 $\mu$sec., then the control signal IFB is sampled about five times during the time width T of each block after an N division. In other words, the learning operation based on the formula (2) is executed for the height of each vertex (value of each memory cell) about five times per rotation of the medium.

Figure 10A:
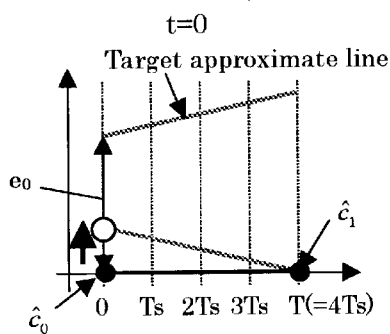
FIGS. 10(A),10(B),10(C),10(D) and 10(E) are diagrams depicting the learning operation of the first embodiment of the present invention.
Figure 10B:
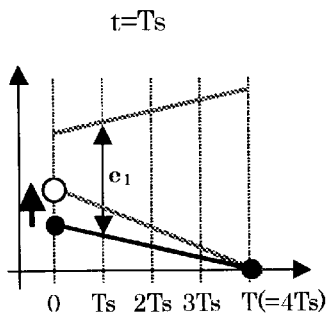
Figure 10C:
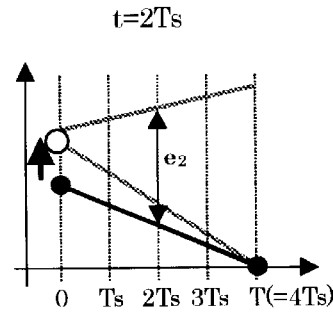
Figure 10D:
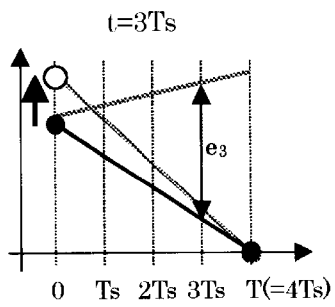
Figure 10E:
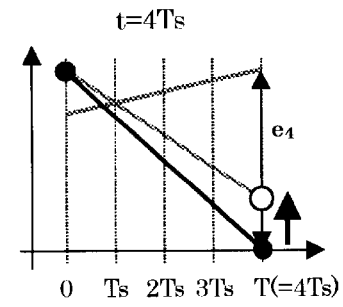

FIGS. 10(A), 10(B), 10(C), 10(D) and 10(E) show diagrams depicting this learning method more specifically. In FIGS. 10(A) to 10(E), the description concerns the block [0≦t<T], but the sampling period Ts of the control system is ¼ of T to simplify description. FIG. 10(A) shows the status when t=0, where learning has not yet been executed and both c$\hat{}$0 and c$\hat{}$1 are zero.

During the block [0≦t<T], that is, during FIGS. 10(A)–(D), c$\hat{}$1 is not updated, only c$\hat{}$0 is updated. At each sampling point, error value e0, e1, e2, e3 or e4 at that time becomes the input of the integration operation of the learning respectively. In the case of t=3Ts shown in FIG. 10(D), for example, error e3 is input, value c$\hat{}$0 is integrated, and the black circle is updated to the white circle.

By linear-interpolating such a learning result, stepped output can be prevented, which is particularly effective when the memory length is short. By linear-interpolating the two continuous memory cells in the output of the learning result, problems caused by discontinuous output due to stepped output can be prevented.

In the description on FIGS. 10(A) to 10(E), an ideal status was described where the phase delay of the feedback control system which requires an additional learning control system, for example, can be ignored. The fundamental principle of the present invention is a learning mechanism for the periodic signal pattern, as shown in FIGS. 10(A) to 10(E), where the signal waveform of an unknown periodic signal is copied while the learning error signal is integrated synchronizing with the period of the periodic signal. As described above, the height of each vertex C$\hat{}$i is updated by the integration operation of the learning error signal, and finally the approximate signal for the learning error to be roughly zero is obtained.

FIGS. 10(A) to 10(E) show an ideal case where the output of the learning control system is incorporated into the learning error signal without any delay. But when this is applied to the track-following control of the disk unit as shown in FIG. 4, the learning error signal becomes IFB.

When the learning control system of the present invention is applied to an actual feedback control system, such as a disk unit, the learning result output is not immediately incorporated into the learning error signal, since a "closed loop characteristic from IFF to IFB of the feedback control system" exists on the path until IFF, which is the learning result output, is incorporated into IFB. This delay makes the learning result becomes vibratory and becomes a cause of aggravation of track-following control accuracy, or learning becomes unstable if the delay is long. Therefore this delay is considered and a function to compensate for the delay is provided to the learning control system so that this delay hardly exists.

In other words, when the FF output section 100 outputs the learning result stored in the ring buffer memory 98 to the feedback control system, time delay, such as the phase delay of the control target, is considered, and the learning result at the time moved forward is the feed-forward output.

Because of the feed-forward output of the learning result at the time moved forward, the use of a phase progress filter is unnecessary, and since the learning control section 82 manages the current pattern to be the feed-forward output corresponding to time t, a memory cell is selected according to the time moved forward considering the phase delay of the control target, and the learning result at that time is output.

By compensating the time moved forward for the feed-forward output of the learning result in this way, a vibratory fluctuation of response waveforms can be prevented like the case when the time moved forward is not compensated, and a stable learning result can be obtained.

Figure 11A:
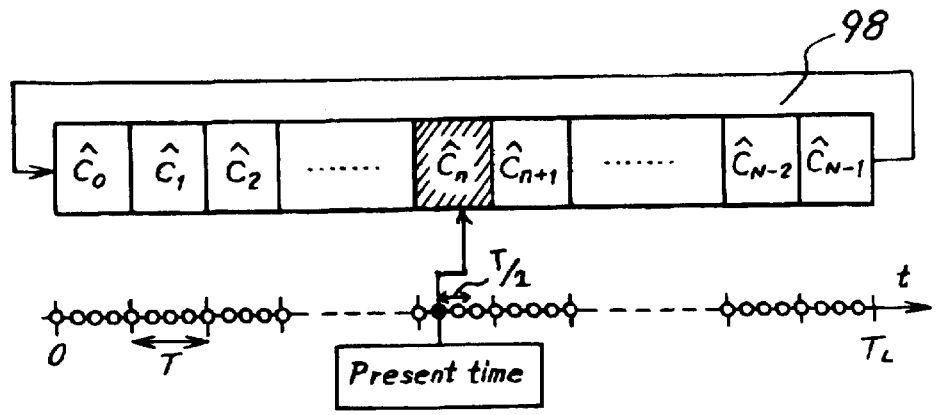
FIGS. 11(A) and 11(B) are diagrams depicting the learning processing of the second embodiment of the present invention.
Figure 11B:
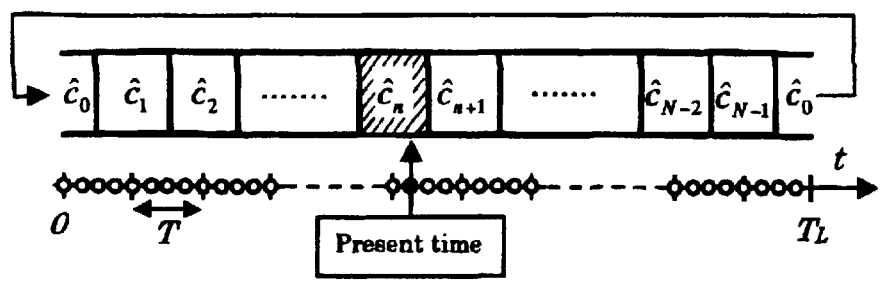
Figure 12:
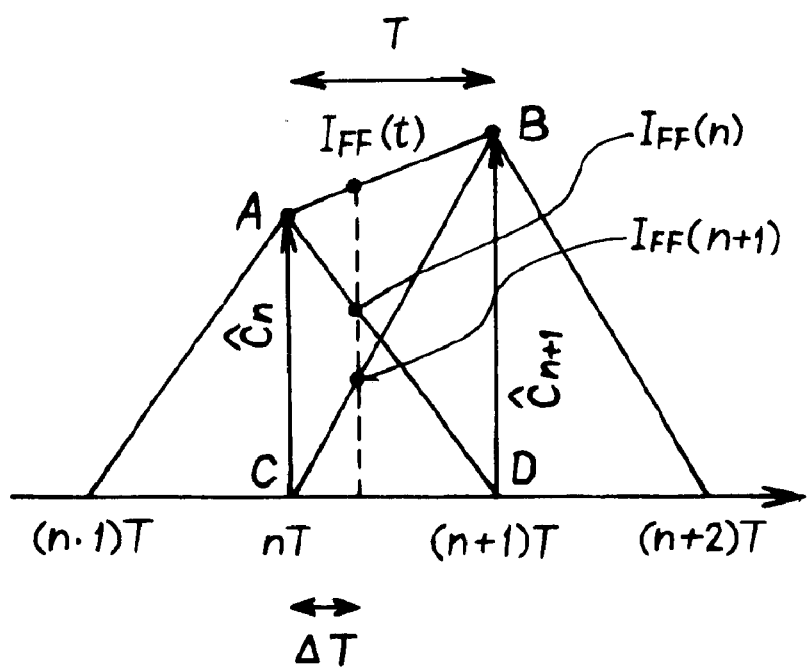
FIG. 12 is a diagram depicting the learning functions of the second embodiment of the present invention.

FIG. 11 is a diagram depicting the second learning algorithm, FIG. 12 is a diagram depicting the approximate function thereof, and FIGS. 13(A) to 13(E) are diagrams depicting the learning operation. In this embodiment, the way to select a memory cell to be updated, which is described in FIG. 7, is improved considering the way to output the linearly-interpolated value of two adjacent memory cells, so that efficient learning (efficient memory update) becomes possible, and learning time can be decreased. The effect is particularly high when high-speed learning is attempted with setting the learning gain high. Convergence errors of a waveform after convergence can also be decreased.

In the above mentioned first embodiment, in the case of $t=3Ts$, $t=T(=4Ts)$ where $c^1$ is allocated is closer in time, the approximate line (unknown) to the target can be more efficiently approached to update the value of $c^1$, rather than updating the value of $c^0$, as shown in FIG. 10.

Figure 13A:
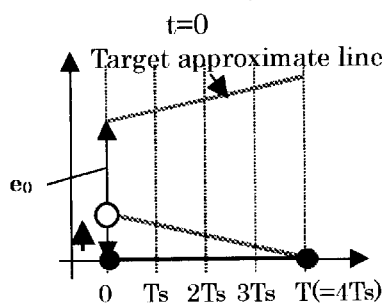
FIGS. 13(A),13(B),13(C),13(D) and 13(E) are diagrams depicting the learning operation of the second embodiment of the present invention.
Figure 13B:
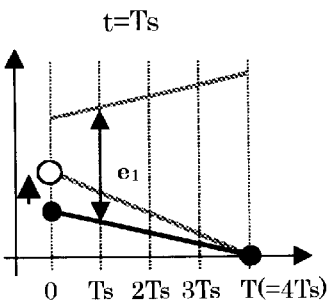
Figure 13C:
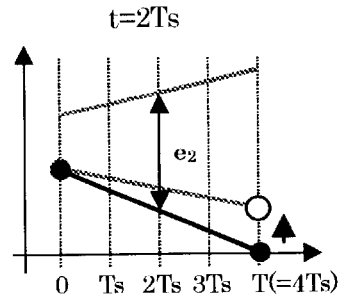
Figure 13D:
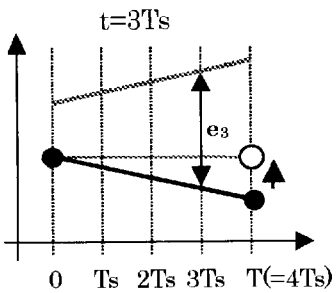
Figure 13E:
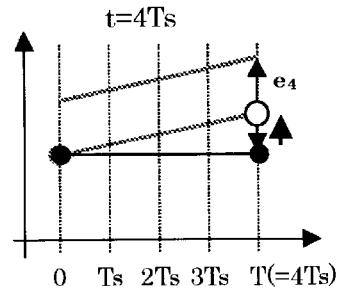

In FIGS. 13(A) to 13(E), just like FIGS. 10(A) to 10(E), the sampling period Ts is ¼ of T for the block $[0 \leq t < T]$ to simplify description. FIG. 13(A) shows the state of $t=0$, where learning has not yet been executed, and both $c^0$ and $c^1$ are zero. During the block $[0 \leq t < Ts]$, that is between FIGS. 13(A) and (B), $c^1$ is not updated, only $c^0$ is updated. During the block $[2Ts \leq t \leq 4Ts]$, that is between FIGS. 13(C)–(E), $c^0$ is not updated, only $c^1$ is updated. At each sampling point, error value e0, e1, e2, e3 or e4 at that time becomes the input of the integration operation of learning respectively. In the case of $t=3Ts$ shown in FIG. 13(D), for example, error e3 is input, the value $c^1$ is integrated, and the black circle is updated to the white circle.

In other words, in the second method, the memory cell selection method is improved so as to update a memory cell closer in time. According to the update target memory cell selection method based on the second method, one memory cell closer to the current time is selected as an update target.

In FIGS. 13(A) to 13(E), at the sampling points shown in (A) and (B), $c^0$ becomes the update target since $c^0$ is closer in time, and $c^1$ becomes the update target at (C), (D) and (E). By making a memory cell allocated to a closer time to be an update target in this way, the convergence of learning can be more efficient, as is clearly shown in the comparison of FIGS. 13(A) to 13(E) and FIGS. 10(A) to 10(E).

Therefore, as FIG. 11(A) shows, the update target cell number iu is changed from formula (1) to formula (8).

$$i = \text{floor}[(t+T/2)/T]$$

$$\text{if } i \leq N-1 \text{ then } iu = i$$

$$\text{if } i = N \text{ then } iu = 0 \tag{8}$$

As the formula (8) is described by using the floor (x) function (a maximum integer value which is equal to or smaller than the argument x), the formula (8) is described in the form of adding a time T/2 to the time t. However, as described above, this memory cell selection method is to select a memory cell closest to the current time t.

Accordingly, the formula (8) is equivalent to below formula (8-1), therefore FIG. 11(A) can be modified to FIG. 11(B).

$$i = \text{round}[t/T]$$

$$\text{if } i \leq N-1 \text{ then } iu = i$$

$$\text{if } i = N \text{ then } iu = 0 \tag{8-1}$$

Note that the round(x) function designates a function to round to an integer value which is closet to the argument x.

As shown in FIG. 9, according to the learning control system with the linear interpolation of this invention, the value stored in the memory cell indicates the height of each vertex located at a boundary of the time domains divided by N. The linear interpolation in the output process that was described by FIG. 8 and the formulas (3), (4) and (5) shows a process to interpolate the value of each vertex.

In the aforementioned memory update method of the first embodiment, the select timing of the updated memory cell shown in FIG. 7 is shifted T/2 from the select timing of the output memory cell in FIG. 8. It is possible that such an inconsistent of time cause the convergence of the learning to unstable.

While, in the memory update method of the second embodiment as described in the formula (8) or (8-1), the memory update timing is shown in FIG. 11(B), therefore the memory update timing becomes a matched relationship with the time scale and the output memory cell as shown in FIG. 8. According to the second embodiment, while it is cancelled to be inconsistent with the relationship to the time scale, it is possible to perform a proper adjustment by the time-lead compensation of Δtl to be considered the closed loop characteristic of the feedback control system which is a learning control object, thereby performing the more stable convergence of the learning than the first embodiment.

As aforementioned, even in this first embodiment, when Δtl is designed, the deigned value is obtained to subtract T/2 from the designed value in the second embodiment. By this, it can be prevented that the memory cell to be output is deviated from the memory cell to be updated to perform a stable convergence of the learning. That is, it is important to make the timing relationship between the select timing of the updated memory cell and the select timing of the output memory cell to be consistent, and then to perform a proper adjustment by the time-lead compensation of Δtl to be considered the closed loop characteristic of the feedback control system which is a learning control object, in order to perform the stable convergence of the learning.

Now a case of simultaneously updating two memory cells will be described for each processing of DSP 10 with reference to FIG. 14 to FIG. 19.

2. Processing when two memory cells are simultaneously updated;

The third embodiment where two memory cells are simultaneously updated will be described next. In the present invention, a polygonal approximation by linearly connecting the heights of vertices stored in the memory cells is used, as shown in FIG. 9, and in the third embodiment, the nature of approximation by linear interpolation is considered more accurately so as to increase the speed and precision of the convergence of learning. Each processing of DSP 10 in the third embodiment will be described below.

A. Operation of feedback control system;

Just like the above mentioned case of updating a single memory cell, the tracking error signal (TES) is sampled by the AD converter (not illustrated), and the feedback control operation, such as the PID control system, is performed to calculate the output IFB of the feedback control system.

B. Learning processing (memory update processing);

[1] Selecting two target memory cell numbers to be updated by learning algorithm;

Based on the time t (0≦t<TL, TL is disk rotation period) synchronizing with disk rotation, two target memory cells to be updated by the learning algorithm are selected. The time t is measured by a timer which is initialized at each disk rotation, and is obtained by reading this timer.

Figure 14:
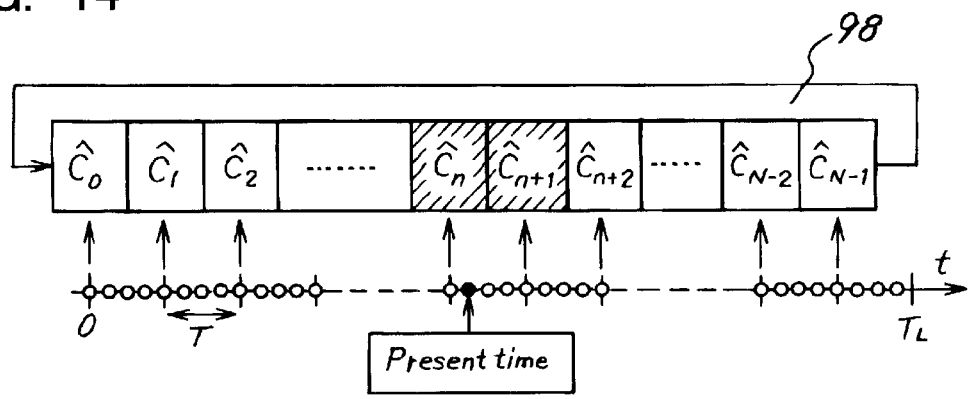
FIG. 14 is a diagram depicting the learning processing of the third embodiment of the present invention.

Just like the above mentioned case (FIG. 7), the learning result is stored in the ring buffer 98 with the length N shown in FIG. 14. The circle symbol indicates a sampling period Ts to execute a series of feedback control operations and learning control operations shown in FIG. 6, just like the case of FIG. 7. The corresponding relationship between each memory cell and time t, however, is different from the case of FIG. 7. FIG. 12 shows vertexes A and B indicated by values C^n and C^(n+1) of the two memory cells next to each other, and the line AB, which is the linear interpolation thereof. The line which passes through the vertex A (nT, C^n) and vertex B ((n+1) T, C^(n+1)) is given by $$IFF(t)=C\hat{}n+[(C\hat{}(n+1)-C\hat{}n)/T]\times\Delta T \quad (9)$$

Where ΔT=t−nT. The formula (9) is transformed to be $$IFF(t)=C\hat{}n\times(1-\Delta T/T)+C\hat{}(n+1)\times\Delta T/T=IFF(n)+IFF(n+1) \quad (10)$$

Here the first term and the second term of the right hand member in formula (10) is a formula to indicate the line AD and the line BC in FIG. 12 respectively. In other words, the approximate line AB when the vertexes A and B are linear-interpolated is the line made by the addition of the line AD and the line BC, as shown in formula (10).

Figure 19:
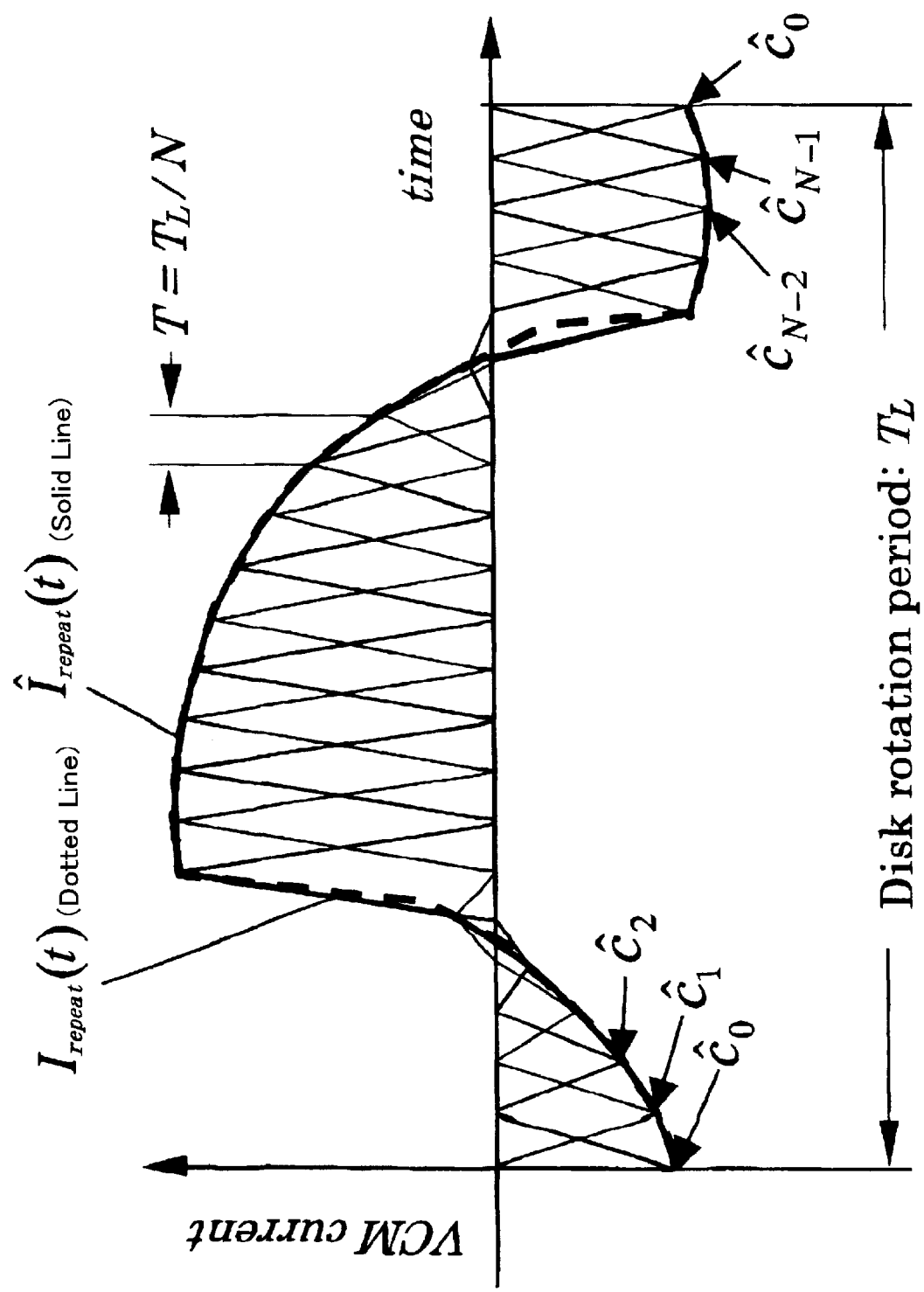
FIG. 19 is a diagram depicting the broken line approximation according to a composition of the triangle functions the learning result of the third embodiment of the present invention.

The above was a description on linear approximation in the block nT≦t<(n+1)T, but this is the same for the other blocks. Therefore, the polygonal approximate function shown in FIG. 9 is equivalent to the function when N number of isosceles triangular functions, where the height is C^i and the base is 2T, are arranged at interval T, and the sum of these is determined as shown in FIG. 19. In other words, this is given by:

[Formula 1]

$$\hat{I}_{repeat}(t) = \sum_{i=0,N-1} \hat{c}_i \cdot \Lambda_i(t) \quad (11)$$

Figure 15A:
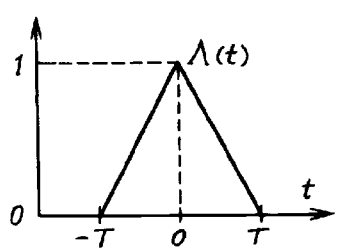
FIGS. 15(A) and 15(B) are diagrams depicting the linear interpolation according to a triangle function of the third embodiment of the present invention.

Here Λi (t) is a triangular function with height 1 defined as follows. At first, the fundamental triangular function Λ (t) shown as FIG. 15(A) is defined as follows.

[Formula 2]

$$\Lambda(t) = \begin{cases} 0 & \text{if} \quad t < -T \\ \frac{1}{T}t+1 & \text{if} \quad -T \le t < 0 \\ -\frac{1}{T}t+1 & \text{if} \quad 0 \le t < T \\ 0 & \text{if} \quad T \le t \end{cases} \quad (12)$$

Λi (t) is the result when the fundamental triangular function Λ (t) is shifted in the time direction at interval T.

[Formula 3]

$$\Lambda_i(t)=\Lambda(t-iT) \quad (13)$$

Here, T is a time interval when N number of triangular functions are laid out, so T=$T_L$/N. Λo (t), however, is at the boundary of the ring buffer, so this is defined as follows as an exception.

[Formula 4]

$$\Lambda_0(t) = \begin{cases} -\frac{1}{T}t+1 & \text{if} \quad 0 \le t < T \\ 0 & \text{if} \quad T \le t < (N-1)T \\ \frac{1}{T}(t-NT)+1 & \text{if} \quad (N-1)T \le t < NT \end{cases} \quad (14)$$

Figure 15B:
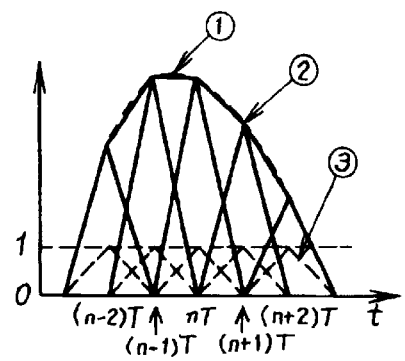

$\Lambda_0$ (t)~$\Lambda_{N-1}$ (t), which are triangular functions where the heights are 1 and the bases are 2T, indicate how much weight the height C^0–C^(N−1) of the vertex stored in the corresponding memory cells participates in the linear approximate function Î repeat (t) given by the formula (11). In other words, as formulas (12) and (14) and FIGS. 15(A), 15(B) and 12 show, each memory cell value influences 100% at the vertex position where the memory cell is allocated, and does not influence in the range where the time distance from the vertex position exceeds ±T. In the ±T range, weight linearly attenuates as it moves away from the vertex position.

In the third embodiment, the learning gain is set considering this feature of the linear interpolation, as described later, so as to increase the speed and the precision of the convergence in polygonal approximation type learning.

And as FIG. 14 shows, two memory cells, which are allocated to the boundary points at both ends of the time range where the current time t is included, are selected as the target memory cells to be updated by the learning algorithm.

To determine the memory cell numbers to be an update target, the memory cell numbers (iu1, iu2), corresponding to the two update target memory cells, are determined by computing the following formula (15), for example, based on the time t read from the above mentioned timer.

iu1=floor(t/T)

iu2=iu1+1 if iu1<N−1 iu2=0 if iu1=N−1 (15)

Here for the floor (x) function, the maximum integer value which is equal to or smaller than the argument x is returned. According to this formula (15), two memory cells next to each other are sequentially selected according to the current time t, as shown in FIG. 14. If iu1 is N−1, however, iu2 becomes zero (beginning of ring buffer), as the formula (15) shows. In this case, only $c\hat{}iu1$ and $c\hat{}iu2$, which are values stored in the two memory cells selected by the formula (15), are updated according to the following learning rule in[2]. Values in other memory cells are not updated.

[2] Updating target memory cells (learning);

The two values $c\hat{}iu1$ and $c\hat{}iu2$ selected by the formula (15) are simultaneously updated as the following formula (16).

$$c\hat{}iu1(N)=c\hat{}iu1(L)+k \times Ts \times (1-\lambda) \times IFB$$

$$c\hat{}iu2(N)=c\hat{}iu2(L)+k \times Ts \times \lambda \times IFB \quad (16)$$

Here $\lambda$ is a weighting factor to provide the update ratio of the two values to be simultaneously updated, and is $0 \leq \lambda < 1$. Further, k is a learning gain, and Ts is a sampling period.

$\lambda$ is determined as the following formula (17) using the current time t.

$$\lambda = \Delta T/T = (t-iu1 \times T)/T \quad (17)$$

Figure 16:
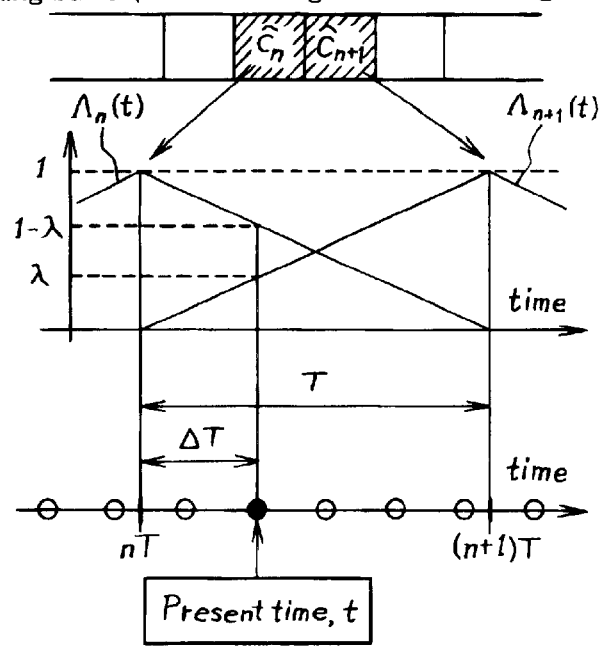
FIG. 16 is a diagram depicting the learning operation of the third embodiment of the present invention.

This relationship is depicted in FIG. 16. FIG. 16 shows the case when iu1=n and iu2=n+1. $\lambda$ is a weighting factor to provide the ratio of distance between the current time t and the boundary time at both ends at the time block $nT \leq t < (n+1)T$. The values $c\hat{}iu1$ and $c\hat{}iu2$ after the update by formula (16) are written to the ring buffer 98 again.

C. Learning result output processing (memory output processing);

[1] Selecting two memory cell numbers to be output targets;

When the learning result is output as mentioned above, the time-lead compensation of $\Delta tl$ is added so as to assure the stability of the convergence of learning, and the memory cell number io of the output target cell is determined as the above mentioned formula (3).

$$io = \text{floor}((t+\Delta tl)/T) \quad (3)$$

Then a memory cell next to this memory cell is also selected for linear interpolation. Since $\Delta tl$ has been added, io in the formula (3) may be N−1 or more. In this case, an applicable memory cell is selected returning to the beginning of the ring buffer 98. Therefore the two memory cell numbers to be selected, io1 and io2, are given by the above mentioned formula (4).

if $io \leq N-2$ then $io1=io, io2=io+1$ if $io=N-1$ then $io1=N-1, io2=0$ if $io \geq N$ then $io1=io-N, io2=io1+1$ \quad (4)

By linear interpolation, the stepped output is prevented, which is particularly effective when the memory length is short. By executing linear interpolation for the two adjacent memory cells in the learning result output, problems caused by discontinuous output due to stepped output in a conventional method can be prevented.

In this selection of output memory cells, as the time lead compensation $\Delta tl$ is added, there is a case that the selected output memory cell is different from the selected update memory cell by above [B. learning process]. Just like the case of FIG. 8, the selection status of the output target memory cells is shown at the same sample as in the case of FIG. 14. In FIG. 14, a set of cells $c\hat{}n$ and $c\hat{}n+1$ is selected to be updated, but, in FIG. 8, as the time lead compensation $\Delta tl$ has been added to select the output target cells, the next set of cells $c\hat{}n+1$ and $c\hat{}n+2$ is selected for output target cells. If $\Delta tl \geq T$, a set of memory cells to be updated and a set of memory cells to be output are always different. If $\Delta tl < T$, however, a set of cells to be a learning target and a set of cells to be an output target may become the same depending on the timing of the control sample.

T is $T=T_L/N$, which is determined depending on the rotation period $T_L$ of the disk and the number of memories N which provide the time resolution to represent an unknown function, but $\Delta tl$ is used to compensate for the phase delay of the target control system, so the length relationship of T and $\Delta tl$ generally differs depending on the target this method is applied to.

[2] Calculating learning control system output value IFF;

When an approximate function is represented using the triangular function as a fundamental function, the following formula (18) is calculated using the memory cell values selected in [1] so as to calculate the output IFF.

$$IFF = c\hat{}io1 \times (1-\lambda o) + c\hat{}io2 \times \lambda o \quad (18)$$

Here $\lambda o$ is determined by the following formula (19).

$$\lambda o = \Delta T/T = [(t+\Delta tl) - \text{floor}((t+\Delta tl)/T) \times T]/T \quad (19)$$

Here t is a current time, and $\Delta tl$ is the value for the time-lead compensation.

Figure 17:
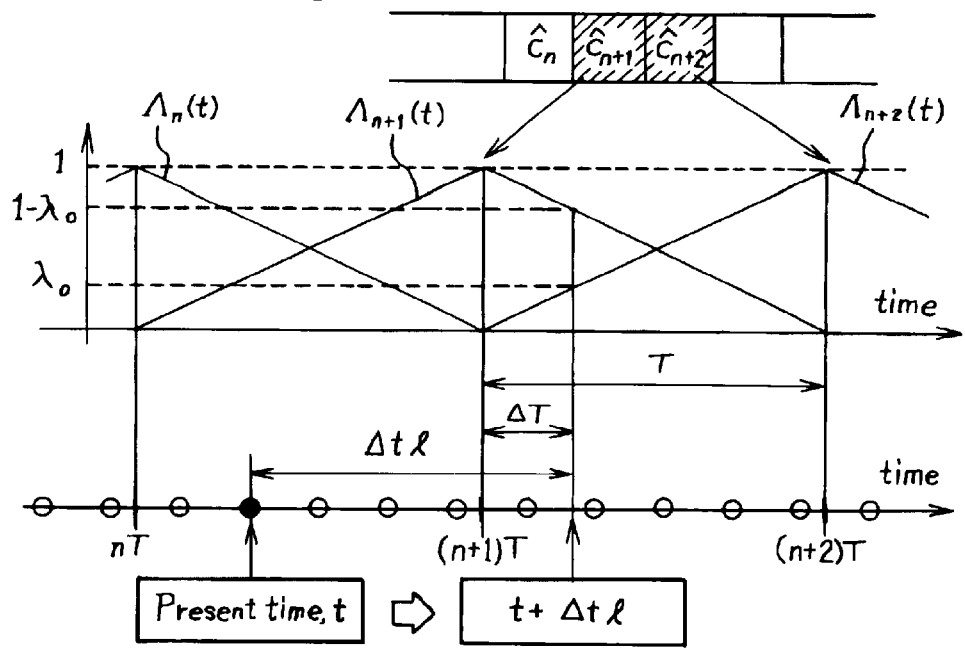
FIG. 17 is a diagram depicting the relationship between the time lead compensation and the linear interpolation process of the third embodiment of the present invention.

FIG. 17 depicts the output computing processing at the same sampling time as FIG. 16. In output processing, the output target memory cells are selected and the output computing processing is executed using the time $(t+\Delta tl)$ where the time-lead compensation value of $\Delta tl$ has been added. In the learning processing in FIG. 16, which is based on the current time t, the block $nT \leq t < (n+1)T$ is the update target, and the set of cells $c\hat{}n$ and $c\hat{}n+1$ becomes the update target cells, but in the case of the example of the output computing processing in FIG. 17, the next set of cells $c\hat{}n+1$ and $c\hat{}n+2$ becomes the target of the output computing processing.

The triangular functions $\Lambda i(t)$ (these have height 1) shown in FIG. 17 provide the weight to interpolate the value of the respective memory cell in the respective time block. The formula (19) determines $\lambda o$ (<1) which is one weight at time $(t+\Delta tl)$, and a value when both memory cells are linearly interpolated is calculated by the formula (18).

D. Adding learning control system output value and feedback control value;

As mentioned above, IFF determined in C-[2] and the IFB calculated in A are added, and the VCM drive signal IVCM is obtained as shown in the above mentioned formula (6)

$$IVCM = IFF + IFB \quad (6)$$

FIGS. 18(A) to 18(E) are diagrams depicting the learning operation to update the two memory cells. In the second embodiment (FIG. 11 to FIG. 13), a closer memory cell value is merely selected as an update target, but in this embodiment where two memory cells are updated, the update gain of the values of the memory cells on both sides are continuously changed according to the time distance from the current time. In other words, the update gains of the memory values on both sides are changed considering the degree of participation of the memory cell values on both sides in the interpolation value output at the current time. As described above, $\lambda$o (=$\Delta$T/T) is a factor to indicate the degree of participation, as shown in the linear interpolation formula (18).

The learning formula (16) indicates that the memory cells on both sides are updated considering $\lambda$. This will be described with reference to the example in FIGS. 18(A) to 18(E). In FIG. 18(A), where $\Delta$T=0, so, $\lambda$ is $\lambda$=0, that is, $$c^{\wedge}0(N)=c^{\wedge}0(L)+k \times Ts \times 1 \times e0$$

$$c^{\wedge}1(N)=c^{\wedge}1(L)+k \times Ts \times 0 \times e0$$

and only $c^{\wedge}0$ is updated, as seen in FIG. 18(A). $c^{\wedge}1$, which does uniquestionably not participate, is not updated.

In FIG. 18(B), where $\Delta$T=Ts=T/4, then $\lambda$ is $\lambda$=¼, that is $$c^{\wedge}0(N)=c^{\wedge}0(L)+k \times Ts \times \text{¾} \times e1$$

$$c^{\wedge}1(N)=c^{\wedge}1(L)+k \times Ts \times \text{¼} \times e1$$

In other words, the value in proportion to ¾ of the error is allocated to $c^{\wedge}0$ and is integrated, and the value in proportion to the remaining ¼ is allocated to $c^{\wedge}1$. The integrating amount is adjusted according to the degree of closeness.

In FIG. 18(C), where $\Delta$T=2Ts=T/2, then $\lambda$ is $\lambda$=½, that is $$c^{\wedge}0(N)=c^{\wedge}0(L)+k \times Ts \times \text{½} \times e2$$

$$c^{\wedge}1(N)=c^{\wedge}1(L)+k \times Ts \times \text{½} \times e2$$

In other words, the value in proportion to ½ of the error is allocated equally to $c^{\wedge}0$ and $c^{\wedge}1$.

Since this is a center time between the memory cells, both [$c^{\wedge}0$ and $c^{\wedge}1$] are integrated equally. This is quite reasonable.

In FIG. 18(D), where $\Delta$T=3Ts=3T/4, then $\lambda$ is $\lambda$=¾, that is $$c^{\wedge}0(N)=c^{\wedge}0(L)+k \times Ts \times \text{¼} \times e3$$

$$c^{\wedge}1(N)=c^{\wedge}1(L)+k \times Ts \times \text{¾} \times e3$$

In other words, the value in proportion to ¼ of the error is allocated to $c^{\wedge}0$, and the value in proportion to the remaining ¾ is allocated to $c^{\wedge}1$.

In this way, in this embodiment, the integrating amount is allocated considering the characteristic of the linear interpolation according to the current time when memory is updated, so the characteristic of the unknown function can be more effectively converged to a target value.

FIG. 20 is a table comparing prior art and the first to third embodiments. In the first to third embodiments, the output interpolation processing and the time-lead compensation are executed and the delay of the feedback control system is also compensated for. Therefore the feed-forward output is smoother than prior art, and also high precision learning is possible even if the memory length is short. As for the learning processing, in the case of the first embodiment where the characteristic of the linear interpolation is not considered, convergence is eventually possible if the learning gain is appropriately selected, but unnecessary processes are included in the convergence steps, and as a result, the learning output may fluctuate in the convergence steps and cause problems, or the time to reach convergence may be long. And in the worst case, the learning convergence may become unstable.

In the third embodiment, on the other hand, an unnecessary fluctuation of the learning output can be avoided and a learning control system which converges quickly can be constructed. In the second embodiment, which is between the first and third embodiments, relatively efficient convergence is possible with less calculation volume than the third embodiment. In practical terms, the second embodiment is a highly effective method as well.

Figure 22:
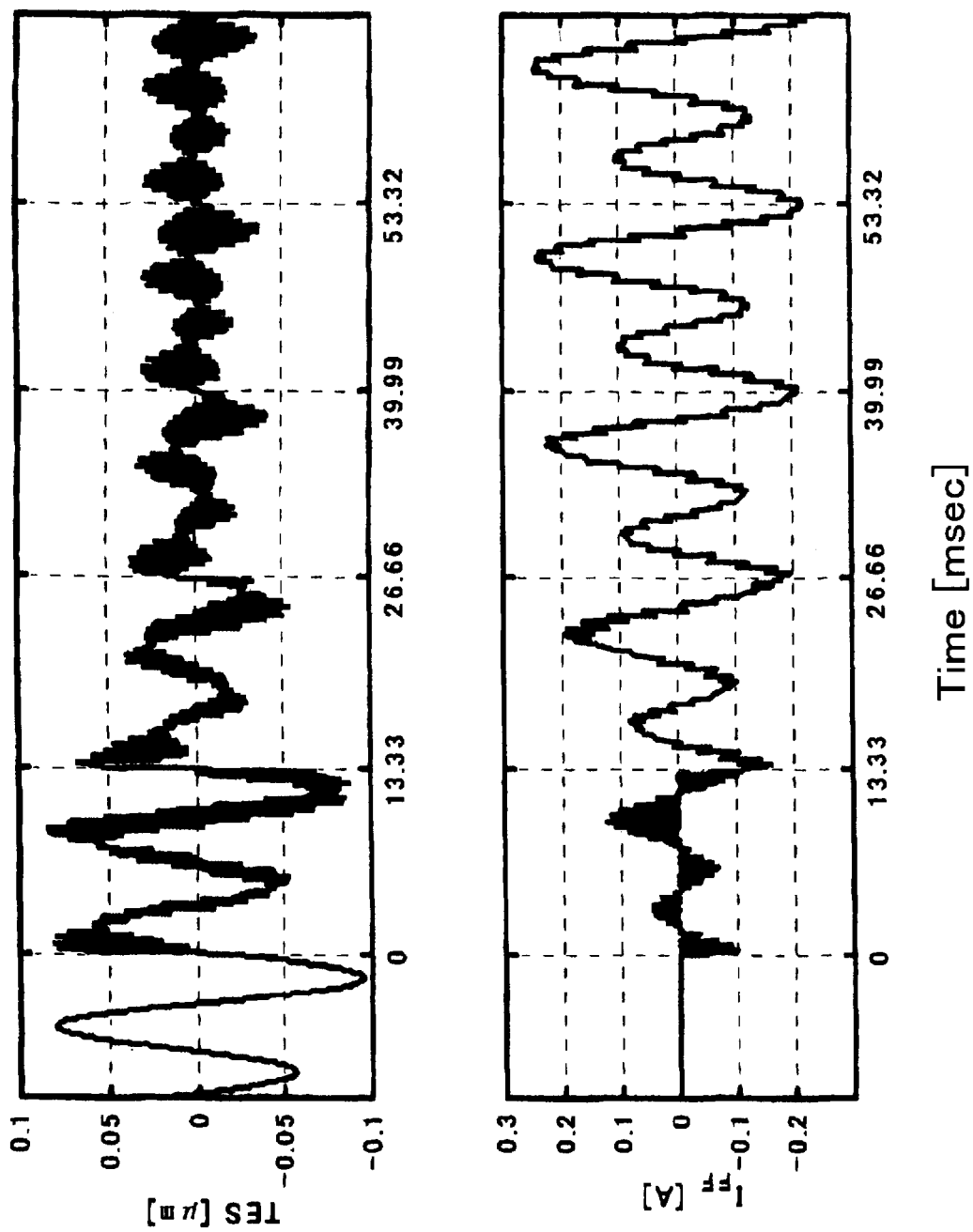
FIG. 22 is waveform diagrams of the tracking error signal and the feed-forward signal from the start to the end of learning by a conventional learning control as a comparison example.
Figure 23:
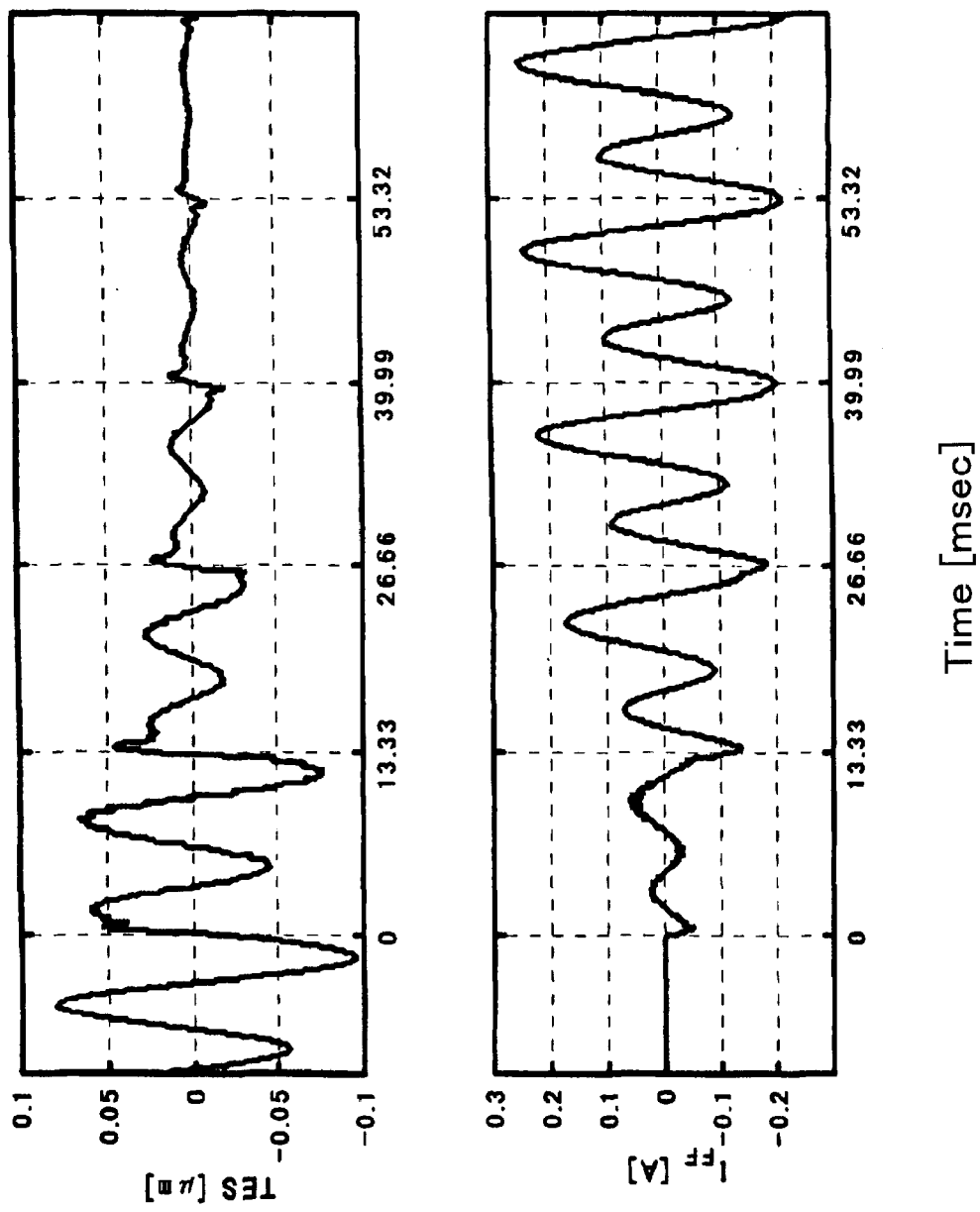
FIG. 23 is waveform diagrams of the tracking error signal and the feed-forward signal from the start to the end of learning by the learning control of the embodiment of the present invention.

FIG. 21 to FIG. 23 are diagrams depicting simulation results. FIG. 21 is a comparison example which indicates track-following errors when only a feedback control system is used for control. In this case, a ±40 $\mu$m primary eccentricity and ±20 $\mu$m secondary eccentricity are synthesized. FIG. 22 is a comparison example when the learning control system of prior art is added under the same condition, and FIG. 23 is an example when the learning control system according to the third embodiment is added. In both FIG. 22 and FIG. 23, where one round is divided into 32 and learning starts from time 0, the top graph shows the track-following error TES, and the bottom graph shows the learning result (feed-forward signal) IFF.

Since learning gain is the same for both FIG. 22 and FIG. 23, the trend in the progress of learning is almost the same, but in FIG. 22, the learning result is output by stairs, so the track-following error TES fluctuates even if learning roughly converges, and accuracy at a certain degree or higher cannot be obtained. In the embodiment in FIG. 23, however, the learning result is smooth, and the track-following error does not fluctuate once learning roughly converges.

By executing the interpolation processing and the time-lead compensation for the feed-forward output of the learning result in this way, the fluctuation of a response waveform can be prevented, and a stable learning result can be obtained.

[Other Embodiments]

Figures 24, 25:
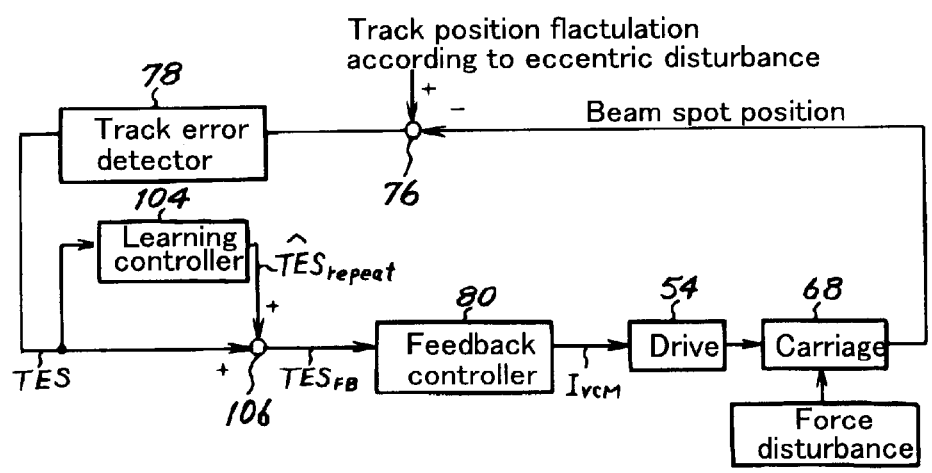
FIG. 24 is a diagrams the learning result output mode of another feedback control of the present invention.
FIG. 25 is a block diagram of the second embodiment of the present invention where a learning control section is created between a tracking error detection section and a feedback control section.

FIG. 24 is a diagram explaining another feedback control processing of the present invention. In the case of the example in FIG. 6, feed-forward output processing (C) is simultaneously executed with the learning processing (B), but in FIG. 24, the learning processing is executed in advance immediately after a disk is inserted into the drive, for example, the learning result is stored in the ring buffer memory 98, and then a fixed value of the ring buffer 98 is feed-forward processed during read and write processing. In other words, the processing in FIG. 24, omitting the learning processing B in FIG. 6, is executed. The content of each processing is the same as the above mentioned processing.

In the present invention, the processing shown in FIG. 6 may be continued, or the processing in FIG. 6 may be executed only during a specified time, then the processing in FIG. 24 may be executed using the value in the ring buffer as a fixed value.

In the case of a device where random access is frequently executed, such as an MO drive, complex seek control is entered during track-following controls. In a still state, a track jump (kick back) is also executed. In such an actual device, the latter operation method can be implemented more easily.

In the case of an application where relatively large files are continuously read, such as a CD and DVD, a method of continuously processing in FIG. 6 can also be implemented easily.

Also some variations are possible for initial status in the ring buffer memory 98. For the first learning, such as immediately after disk insertion, learning may be started with initial values of the ring buffer memory 98 all zero, but thereafter, the learning convergence time can be decreased if learning is started in a state where already learned values are stored as the initial state.

When the learning control section 82 is provided between the feedback control section 80 and the carriage drive section 54, as the feedback current for the carriage drive section 54, which is output from the feedback control section 80, is the learning target, the learning result is acquired in the same dimension as that of the feedback current. Therefore, the learning result can be output directly to the feedback control system as a feed-forward current at seek control, on-track control and kick back control.

FIG. 25 is a block diagram depicting the second embodiment of the head positioning control system of the storage device of the present invention. In the second embodiment, the learning control section 104 is placed between the tracking error detection section 78 and the feedback control section 80.

The tracking error signal TES from the tracking error detection section 78 is input to the learning control section 104 for learning processing, the learning tracking error signal TES^repeat, obtained as a result of the learning, is added to the tracking error signal TES from the tracking error detection section 78 at the addition point 106, and is input to the feedback control section 80 as a feedback signal TESFB.

The basic configuration of this learning control section 104 is the same as that in the first embodiment in FIG. 5, except for inputting the tracking error signal TES for learning and outputting the learning tracking error signal TES-^repeat as a learning control signal.

In the learning algorithm by the learning control section 104 in FIG. 25, the time function in each rotation period is defined for the tracking error signal TES, rather than the periodic feedback current in the first embodiment in FIG. 5, and each rectangular function after N division and the approximate function TES^repeat (t) as the height $C^i$ of the triangular function are determined in the same way.

Figure 26:
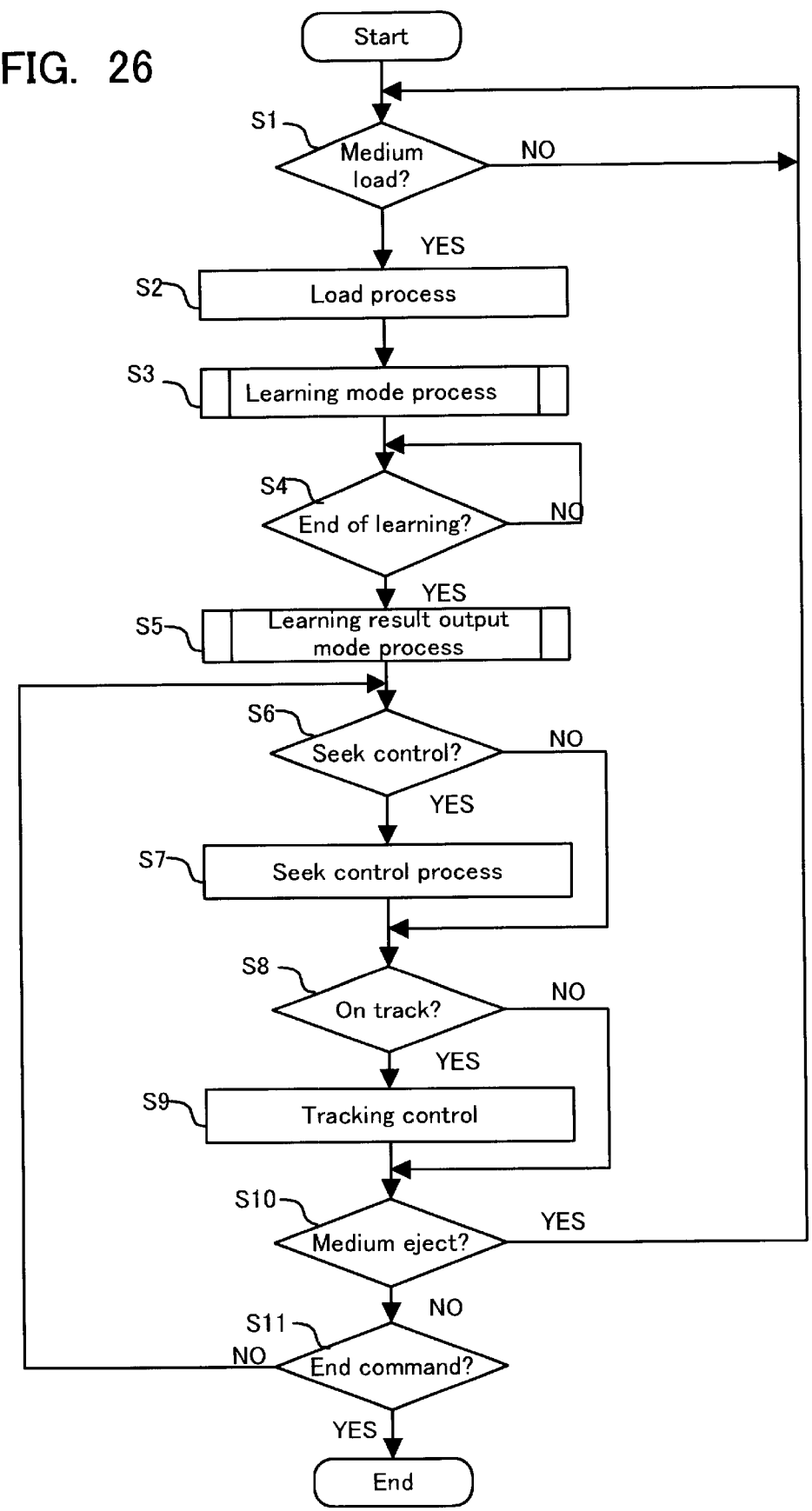
FIG. 26 is a flow chart depicting the medium processing in FIG. 3.

FIG. 26 is a flow chart depicting the positioning control in the disk unit comprising the learning control section 82 in FIG. 4. When the medium is loaded into the unit in Step S1, the medium load processing is executed according to the predetermined medium load sequence in Step S2. In this medium load processing, processing based on the learning mode in Step S3 is executed by the learning control section 82 of the present invention.

At the end of the learning processing based on this learning mode, the learning convergence is judged by evaluating the number of times of learning, the learning time, and/or the tracking error signal TES. For example, if the end of learning is judged by the learning time, the number of times of rotation of the disk after the start of learning is counted, and learning ends at a predetermined number of times.

When the end of learning is checked in Step S4, processing advances to Step S5, which is processing in learning result output mode. In the learning result output mode, the learning result obtained in Step S3 is feed-forward output to the feedback control system as a fixed value.

Therefore in the seek control and tracking control from Step S6, the eccentric disturbance synchronizing with the rotation of the medium, particularly the frictional disturbance which occurs at the timing when the moving speed becomes zero along with the reciprocating movement of the carriage corresponding to the medium eccentricity, is effectively suppressed, and a stably controlled environment free from periodic disturbance can be created for the feedback control system.

After the learning result output mode in Step S5, the processing advances to Step S7 if seek control is selected in Step S6, and seek processing, that is, coarse control for positioning the carriage to the target track by controlling the speed, is executed, and when the carriage is positioned on the target track by this seek control in Step S8, the tracking control to follow-up the optical beam to the target track center is executed in Step S9.

The seek control or the on-track control in Steps S6–S9 corresponding to the processing of the learning result output mode in Step S5 is repeated until ejection of the medium is detected in Step S10, and when the medium is ejected, processing returns to Step S1 and learning processing in the learning mode in Step S3 is executed again when the next medium is loaded. When termination is instructed in Step S11, the processing series is terminated.

In the processing by the learning control section 82 in the learning mode in Step S4, the approximate function is obtained at each of the plurality of locations in the disk radius direction. At this time, the learning control section 82 applies the learning algorithm with the already existent approximate function data as the initial values for obtaining the approximate functions at the plurality of locations, if an approximate function obtained at another location exists.

For processing in the learning result output mode in Step S5, which is the feed forward time after learning, the learning control section 82 selects an approximate function to be used according to the position in the radius direction at that time, and feeds forward the approximate function.

For example, it is assumed that there are 15000 tracks from the internal circumference to the external circumference of the disk. At first, the approximate function obtaining operation is executed at around the $7500^{th}$ track, which is around the intermediate circumference. Then in order to obtain an approximate function near the internal circumference, seeking is moved to around the $2500^{th}$ track, and at around the $2500^{th}$ track the approximate function obtaining operation is executed using a separately provided memory cell for obtaining an approximate function for the internal circumference.

Seeking is then moved to around the $12500^{th}$ track for obtaining an approximate function near the external circumference, and at around the $12500^{th}$ track, the approximate function obtaining operation is executed using a separately provided memory cell for obtaining an approximate function for the external circumference. If learning is ended when the disk rotates 100 times, the learning executed at the $7500^{th}$ track is performed, for example, between the $7500^{th}$ and $7600^{th}$ tracks.

In the learning at the internal circumference, which is executed thereafter, the initial value of the approximate function (each initial value of memory cell) is not started from zero, instead the learning result at the intermediate circumference is copied, and this value is used as the initial value to start learning since the approximate function at the internal circumference is similar to the function obtained at the intermediate circumference, therefore learning can be shortened and can be ended, for example, when the disk rotates 50 times. The learning time for learning at the external circumference can also be decreased in the same way.

The above processing is executed when, for example, the medium is loaded. Three approximate functions, for the internal circumference, intermediate circumference and external circumference, are prepared. And when a read/write operation is executed, moving the carriage to the $1^{st}$ to $5000^{th}$ tracks, the approximate function obtained around the $2500^{th}$ track is fed forward.

When a read/write operation is executed, moving the carriage to the $5001^{st}$ to $10000^{th}$ tracks, the approximate function obtained around the 7500$^{th}$ track is feed-forwarded. When a read/write operation is executed, moving the carriage to the 10001$^{st}$ to 15000$^{th}$ tracks, the approximate function obtained around the 12500$^{th}$ track is fed forward.

Because of this, compared with the case when the approximate function obtained at one location around the intermediate circumference is used for the entire area, from the internal circumference to the external circumference, a more accurate track-following operation is possible even if the circularity of the track of the disk is different between the internal circumference and the external circumference, or even if the difference of phase and amplitude of a periodic disturbance along with the spindle rotation between the internal and external circumferences cannot be ignored, or even if friction is different between the internal circumference and external circumference when the pickup having a fine and coarse control integrated type structure is used.

Figure 27:
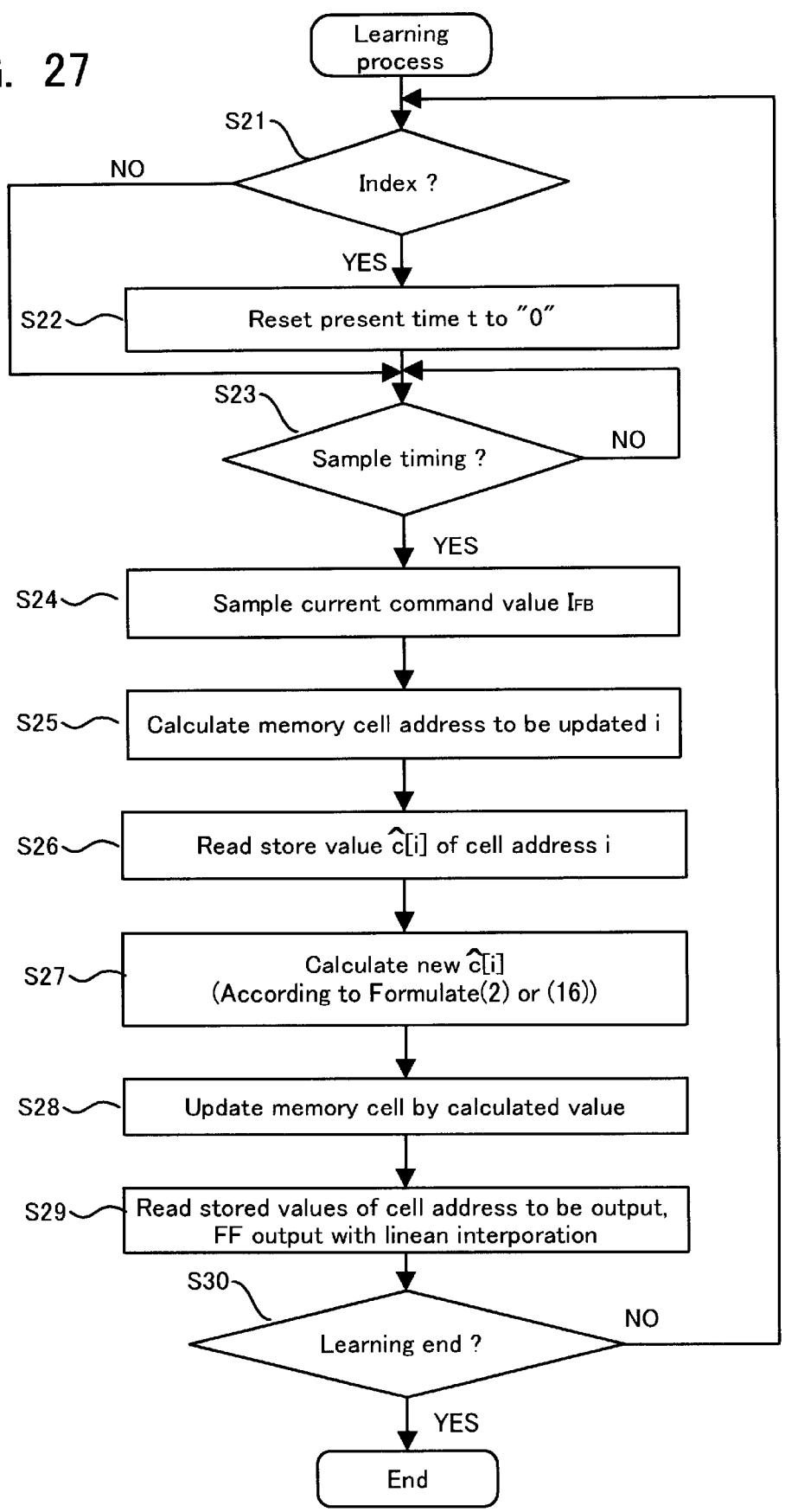
FIG. 27 is a flow chart depicting the learning mode in FIG. 26.

FIG. 27 is a flow chart depicting the learning processing of the learning control section 82 in FIG. 5 in learning mode. In this learning processing, whether the index which is obtained at each rotation of the medium exists, is checked in Step S21, and when the index is obtained, processing advances to Step S22, the current time t is reset to t=0, and whether it is the sampling timing or not is checked in Step S23.

When it is sampling timing, the current indication value IFB is sampled as a control signal in Step S24, and in Step S25, the address(es) i of the memory cell(s) (one memory cell in the first and the second embodiment and two memory cells in the third embodiment shown in FIG. 20) are calculated from the time t at this point, and the storage value(s) c^[i] at the cell address(es) i is read in the step S26.

Then in Step S27, a new storage value(s) c^[i] is calculated, and in Step S28, the cell(s) of the memory is updated by storing the newly computed storage value(s). Then in Step S29, the calculated cell addresses for output, that is, the storage values of the two cell addresses located at ΔTl ahead are read, are linearly interpolated, and feed-forward output to the feedback control system. Such processing in Steps S21–S29 is repeated until the learning termination condition is met in Step S30, for example, reaching the learning time which was set in advance.

Figure 28:
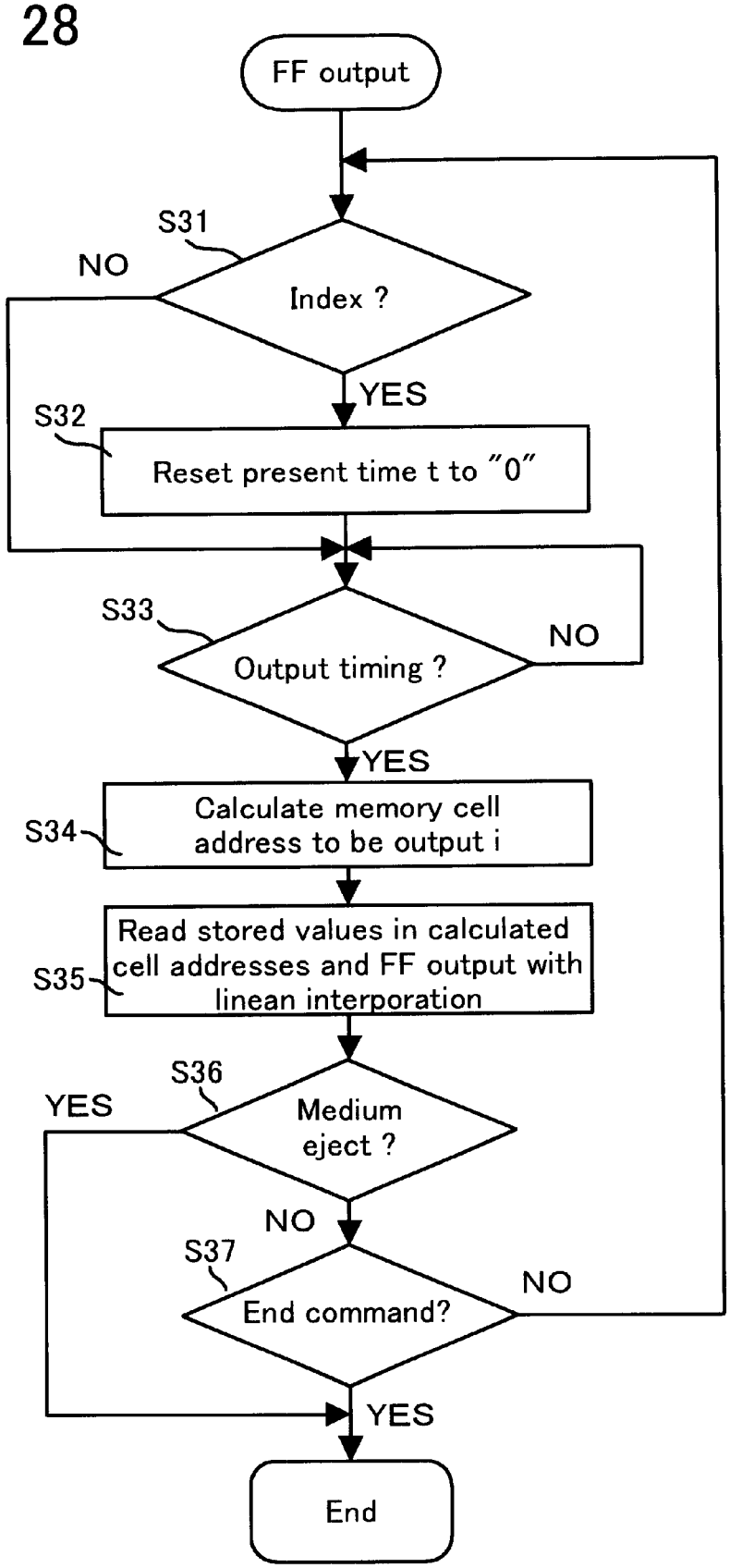
FIG. 28 is a flow chart depicting the learning result output mode in FIG. 26.

FIG. 28 is a flow chart depicting the feed-forward output processing of the learning control section 82 in FIG. 5 in learning result output mode. In this feed-forward output processing, whether the index, which is obtained at each rotation of the medium, exists, is checked in Step S31, and if the index is obtained, the current time t is reset to t=0 in Step S32, and whether it is output timing or not is checked in Step S33.

This output timing is, for example, timing determined by the same output period as the sampling period Ts in the learning mode in FIG. 27. When it is judged as output timing in Step S33, the addresses i and i+1 of the memory cells, based on the time when the time-lead compensation of Δtl is added to the current time t, are calculated in the Step S34, and in Step S35, the storage values of the two cell addresses are read, are linearly interpolated, and are feed-forward output to the feedback control system. When the medium is ejected in the Step S36 or if termination of the unit is instructed in Step S37, feed-forward output is terminated.

The above embodiments are the cases when an optical storage device is used as an example, but the present invention can be applied to a magnetic storage device and other appropriate storage type devices, and the disk can have not only a disk shape but also includes a card shaped disk. The present invention is not limited to the above embodiments, but includes appropriate modifications which do not minimize the objects and advantages. The present invention is not limited by the numeric of the above embodiments.

As described above, according to the present invention, the high-speed memory update rate, the high-speed output rate and the interpolation processing are combined in the learning control section, so that stepped output is prevented, feed-forwarding high frequency disturbance by stepped output is prevented, and high precision track-following control can be implemented. Particularly in the case of removable media, such as MO, eccentricity is relatively large compared with HDD, and when a medium with a large eccentricity is used, the amplitude of periodic disturbance becomes high, and the discontinuity of the stepped output of the learning result becomes conspicuous (in other words, the height difference between steps becomes conspicuous), so the effect of smoothing by linear interpolation is high.

Also by combining the learning result output period which is shorter than the period (TL/N) when the time for one disk rotation TL is divided by the memory length N, and the above mentioned linear interpolation processing, a very smooth periodic disturbance compensation signal can be output, and extremely high precision track-following control can be implemented.

Since stepped output is prevented, the memory length (number of divisions) can be decreased. In other words, decreasing the memory length according to the frequency range (generally a certain frequency or less) of the periodic disturbance to be suppressed has been demanded, but conventional methods could not implement a decrease to a certain number of division or less because of the stepped output problem. So in some cases an unnecessarily high frequency range had to be included in the learning target. If unnecessarily high frequency components are included in the learning target, the effect of averaging the non-repetitive disturbance may decrease and the learning result may include noise which impairs track-following accuracy. Particularly when a learning operation is performed at a specified position in the radius direction on the medium, and the learning result is used as a fixed value for the feed-forward processing, the high frequency periodic disturbance may be different depending on the position in the radius direction, and a high frequency periodic disturbance which is valid at the learning location may become a disturbance at another location, which drops track-following accuracy. In such a case, the number of divisions must be decreased in order to limit the frequency range to be the learning target. The present invention can meet such a demand since the present invention can considerably decrease the memory length (number of divisions) compared with prior art.

Also as a secondary effect of decreasing the number of divisions, the high frequency noise included in the learning wave output is decreased by improving the averaging effect on unnecessary high frequency noise, and a higher precision track-following accuracy can be expected. A high frequency non-repetitive disturbance averaging effect can also be expected.

Also as a secondary effect of decreasing the number of divisions, the convergence time of learning can be decreased. For example, if the memory length is decreased by half, the convergence time required for learning at the same magnitude of learning gain can be decreased by half. This can contribute to a decrease in the rise time from disk insertion to an actual access possible state when a disturbance is learned during the load sequence after medium insertion, for example.

What is claimed:

1. A disk apparatus, comprising:
    a head for moving to an arbitrary track position of a disk medium;
    a positional signal detection unit for detecting a positional signal according to the dislocation amount of said head from a predetermined reference position of the track on the medium;
    a feedback control unit for computing a control signal for moving said head from said positional signal so that said dislocation amount is controlled to zero;
    a drive unit for driving said head based on said control signal; and
    a learning control unit for generating and storing an unknown function for one disk rotation that includes a periodic disturbance in memory which is comprised of N number of memory cells by a learning algorithm as an approximate function which is approximated by the height allocated to each time block when the time required for one rotation of said disk medium is divided by N;
    wherein said learning control unit
    samples a signal which follows said positional signal according to said learning algorithm at a sampling period which is less than the time obtained by dividing the time required for one rotation of said medium by N,
    updates said one or more memory cells corresponding to said sampling time synchronizing with said sampling period according to said signal value,
    reads the values of two memory cells located at the cell positions corresponding to said output time at an output period which is less than the time obtained by dividing the time required for one rotation of said medium by N, and
    interpolates the values of said both memory cells based on said output time to generate a periodic disturbance compensation signal.

2. The disk apparatus according to claim 1, wherein said learning algorithm of said learning control unit is for calculating the memory cell value after an update by multiplying said sampled signal by a predetermined or variable gain and adding the computed result to the memory cell value before update.

3. The disk apparatus according to claim 1, wherein said learning control unit reads the values of the two memory cells associated at an advanced time moved forward for a predetermined amount of time from the update target memory cell, and performs interpolating processing for the values of the two memory cells by said learning algorithm, so as to generate a periodic disturbance compensation signal corresponded to said advanced time.

4. The disk apparatus according to claim 1, wherein said learning control unit samples a signal which follows said positional signal, selects two memory cells corresponding to said sampling time, and updates the values of the memory cells by the learning algorithm so as to learn said unknown function.

5. The disk apparatus according to claim 4, wherein said learning algorithm of said learning control unit changes the update gains for the two memory cells to be the update target according to said sampling time and adjusts the update balance between the two memory cells when the two memory cells are updated.

6. The disk apparatus according to claim 1, wherein said learning control unit samples a signal which follows said positional signal, updates a value of one of said memory cells, which is allocated to a time close to said sampling time, by the learning algorithm, so as to learn said unknown function.

7. The disk apparatus according to claim 1, wherein said learning control unit performs learning control at a timing immediately after inserting said medium into the apparatus, and performs feed-forward control for removing a periodic disturbance by outputting the learning result at tracking control after learning.

8. The disk apparatus according to claim 7, wherein said learning control unit performs feed-forward control for removing a periodic disturbance by outputting the learning result at track jump and at seek control after learning.

9. The disk apparatus according to claim 1, wherein said learning control unit executes an operation to obtain an approximate function for each location at a plurality of locations in the disk radius direction when said approximate function is obtained, and selects and feed-forwards the approximate function to be used according to the position in the radius direction at that time when feed-forward is performed after said learning.

10. The disk apparatus according to claim 9, wherein said learning control unit applies the learning algorithm using already existent approximate function data as initial values if the approximate function already obtained at another location exists when the approximate function is obtained at a plurality of locations.

11. The disk apparatus according to claim 1, wherein said head has a carriage mounted with an objective lens which freely moves in the direction crossing the tracks of the medium such that focus can be freely controlled,
    and said head has a fine and a coarse control integrated structure which allows both tracking control for the optical beam to follow the track and seek control for the optical beam to move to an arbitrary track position by moving said carriage.

12. A track-following control method of a disk apparatus, comprising;
    a step of detecting a positional signal according to the dislocation amount of a head which moves to an arbitrary track position of a disk medium, from a predetermined position of the track on said disk medium;
    a feedback control step of computing a control signal for moving said head from said positional signal so that said dislocation amount is controlled to zero;
    a step of driving a drive section for driving said head based on said control signal; and
    a learning control step,
    said learning control step comprising the steps of;
    sampling a signal which follows said positional signal at a sampling period which is less than the time obtained by dividing the time required for one rotation of the medium by N "number";
    updating one or more memory cells corresponding to said sampling time synchronizing with said sampling period according to said signal value;
    reading the values of two memory cells located at the cell positions corresponding to said output time at an output period which is less than the time obtained by dividing the time required for one rotation of the medium by N; and
    interpolating the values of both memory cells based on said output time so as to generate a periodic disturbance compensation signal.

13. The track-following control method for a disk apparatus according to claim 12, wherein said learning control step is for sampling a signal which follows said positional signal and updating the values of said two memory cells corresponding to said sampling time so as to learn said unknown function.

14. The track-following control method for a disk apparatus according to claim 12, wherein said learning control step is for sampling a signal which follows said positional signal and updating the value of said memory cell close to said sampling time so as to learn said unknown function.

15. The track-following control method for a disk apparatus according to claim 12, wherein said learning control step is for controlling learning at a timing immediately after inserting said medium into the unit, and performing feed-forward control for removing a periodic disturbance by outputting the learning result at tracking control after learning.

16. The track-following control method of a disk apparatus according to claim 15, wherein said learning control step performs feed-forward control for removing a periodic disturbance by outputting the learning result at track jump and at seek control after learning.

17. The track-following control method for a disk apparatus according to claim 12, wherein said learning control step is for executing an operation to obtain an approximate function for each location at a plurality of locations in the disk radius direction when said approximate function is obtained, and selecting and feed-forwarding the approximate function to be used according to the position in the radius direction at that time when feed-forward is performed after said learning.

18. The track-following control method for a disk apparatus according to claim 12, wherein said update step of said learning control step is a step for calculating the memory cell value after an update by multiplying said sampled signal by a predetermined or variable gain and adding the computed result to the memory cell value before update.

19. The track-following control method for a disk apparatus according to claim 12, wherein said learning control step comprises a step for reading the values of the two memory cells associated at an advanced time for a predetermined amount of time from the update target memory cell, and performing interpolating processing for the values of the two memory cells, so as to generate a periodic disturbance compensation signal corresponded to said advanced time.

20. The track-following control method for a disk apparatus according to claim 12, wherein said learning step comprises a step for changing the update gains for the two memory cells to be the update target according to said sampling time and adjusting the update balance between the two memory cells when the two memory cells are updated.

* * * * *

UNITED STATES PATENT AND TRADEMARK OFFICE
CERTIFICATE OF CORRECTION

PATENT NO.     : 6,721,247 B2
DATED          : April 13, 2004
INVENTOR(S)    : Ichiro Watanabe It is certified that error appears in the above-identified patent and that said Letters Patent is hereby corrected as shown below:

<u>Column 28,</u>
Line 56, delete ""number"" and insert -- number --.

Signed and Sealed this

Twenty-eighth Day of December, 2004

JON W. DUDAS
*Director of the United States Patent and Trademark Office*